(12) United States Patent  (10) Patent No.: US 6,184,660 B1
Hatular  (45) Date of Patent: Feb. 6, 2001

(54) HIGH-SIDE CURRENT-SENSING SMART BATTERY CHARGER

(75) Inventor: Alexandru Hatular, Campbell, CA (US)

(73) Assignee: Micro International, Ltd. (KY)

( * ) Notice: Under 35 U.S.C. 154(b), the term of this patent shall be extended for 0 days.

(21) Appl. No.: 09/276,616

(22) Filed: Mar. 25, 1999

Related U.S. Application Data

(60) Provisional application No. 60/079,509, filed on Mar. 26, 1998.

(51) Int. Cl.$^7$ .................................................. H02J 7/04
(52) U.S. Cl. ........................................ 320/141; 320/139
(58) Field of Search ................................. 320/141, 139, 320/145, 140

(56) References Cited

U.S. PATENT DOCUMENTS

| | | | |
|---|---|---|---|
| 5,477,132 | * 12/1995 | Canter et al. | 320/101 |
| 5,698,964 | 12/1997 | Kates et al. | 320/22 |
| 5,723,970 | 3/1998 | Bell | 320/30 |
| 5,864,221 | * 1/1999 | Downs et al. | 320/134 |
| 5,920,475 | * 7/1999 | Boylan et al. | 363/127 |

OTHER PUBLICATIONS

System Management Bus Specification, Revision 1.0, Feb. 15, 1995, Copyright 1996.
System Management Bus BIOS Interface Specification, Revision 1.0, Feb. 15, 1995, Copyright 1996.
Smart Battery Charger Specification, Revision 1.0, Jun. 27, 1996, Copyright 1996.
Smart Battery Data Specification, Revision 1.0, Feb. 15, 1995, Copyright 1996.
Smart Battery Selector Specification, Revision 1.0, Sep. 5, 1996, Copyright 1996.

* cited by examiner

*Primary Examiner*—Peter S. Wong
*Assistant Examiner*—Lawrence Luk
(74) *Attorney, Agent, or Firm*—D. E. Schreiber

(57) ABSTRACT

A battery charger IC for controlling operation of a buck converter circuit that includes a series switch and a resistor for sensing battery charging current. The battery charger IC includes a pulse-width-modulation switch drive circuit that, during charging of the battery, supplies to the buck converter circuit with an electrical signal which repeatedly turns-on and then turns-off the series switch. The battery charger IC also includes a charging-current sense amplifier which receives from the current-sensing resistor and amplifies an electrical signal which represents the battery charging electrical current. The charging-current sense amplifier includes a bridge circuit to which is coupled the electrical signal received by the charging-current sense amplifier from the current-sensing resistor and an auto-zero circuit.

42 Claims, 6 Drawing Sheets

HIGH-SIDE CURRENT-SENSING SMART BATTERY CHARGER

CLAIM OF PROVISIONAL APPLICATION RIGHTS

This application claims the benefit of U.S. Provisional Patent Application No. 60/079,509 filed on Mar. 26, 1998.

BACKGROUND OF THE INVENTION

1. Field of the Invention

The present invention relates generally to battery powered electrical devices, and, more particularly, to an improved battery charger integrated circuit ("IC") adapted for inclusion in portable electrical devices.

2. Decription of the Prior Art

A system has been specified for use in battery powered portable devices that is identified as the System Management Bus ("SMBus"). The SMBus prescribes data protocols, device addresses, and additional electrical requirements necessary to transport commands and information among various subsystems of a battery powered device. The SMBus specification envisions the SMBus interconnecting at least a system host computer, a smart battery charger, and a smart battery that are all included in the portable device. Under the SMBus protocol, the smart battery provides data, via the SMBus, to the portable device's host computer. A power management routine executed by the host computer processes such smart battery data to manage operation of at least the smart battery and the smart battery charger.

In accordance with the SMBus specification and protocol, a smart battery accurately reports its characteristics to the host computer via the SMBus. If a portable device includes more than one battery, each battery reports such characteristics independently via the SMBus. Providing the power management routine executed by the host computer with information about the charge state of each battery permits displaying the batteries' condition, and accurately estimating the portable device's remaining operating time. However, in addition to providing information about the batteries' charge state, the information obtained via the SMBus is sufficient to permit electrical power management for the portable device, and to also permit controlling battery charging regardless of a battery's particular chemistry.

To achieve the preceding objectives, the SMBus specifies that, independent of host computer power management routine operation, a smart battery charger must periodically poll a smart battery that is being charged for the battery's charging characteristics. Upon receiving a response from the smart battery, the smart battery charger then adjusts its output to match the smart battery's requirements. To avoid battery damage, the smart battery also reports certain conditions such as over charge, over voltage, over temperature, and too rapid temperature increase to the smart battery charger. In this way the smart battery effectively controls its re-charging cycle. Moreover, to prolong smart battery life, the smart battery charger may prevent a fully charged smart battery from powering the portable device if a source of external electrical power is available.

Analogously, the power management routine executed by the host computer may poll the smart battery, that powers the host computer's operation, for smart battery information. The power management routine can request factual information about the battery such as the battery's chemistry, or the battery's operating temperature, voltage, or charge or discharge current. The power management routine can then either display such information directly and/or to display an estimate of the battery's operating capabilities, or it may process such information for use in the computer system's power management scheme. Similar to the smart charger, the power management routine receives information about critical events if the smart battery detects a problem. Moreover, the power management routine also receives smart battery estimates about end of discharge, electrical capacity remaining below a preset threshold value, and time remaining until discharge below a preset threshold value.

As part of the host computer's power management scheme, the power management routine may provide other routines with information about battery condition. Accordingly, the power management routine may query a device driver routine to determine if an anticipated action will endanger the host computer's electrical power integrity. For example, before attempting to start a hard disk drive the power management routine may first determine if that particular operation might cause the smart battery's output voltage to drop below a threshold for host computer failure. Under such circumstances, the hard disk device driver's response might be to increase power available for starting the hard disk drive by causing the power management routine to turn-off a non-critical power consumption such as liquid crystal display ("LCD") backlighting.

In addition to a smart battery and a smart charger, a portable device that implements the SMBus will, in general, also include a smart battery selector. The SMBus specification and protocol includes a smart battery selector because a portable device may include two or more smart batteries, only one of which may be in use for powering the portable device's operation at any instant in time. In such multi-battery devices, the smart battery selector must arbitrate between or among batteries. Furthermore, the smart battery selector must be capable of swiftly re-configuring the portable devices power if a battery were to be suddenly removed, such as might occur if a battery were removed from a laptop or notebook computer to install a floppy diskette drive.

Additional, more detailed information about the SMBus specifications and protocol, and about smart batteries is provided by:

- System Management Bus Specification, Revision 1.0, Intel, Corporation, Feb. 15, 1995;
- System Management Bus BIOS Interface Specification, Revision 1.0, Intel, Corporation, Feb. 15, 1995;
- Smart Battery Charger Specification Revision 1.0, Duracell Inc. and Intel Corporation, Jun. 27, 1996;
- Smart Battery Data Specification Revision 1.0, Duracell Inc. and Intel Corporation, Feb. 15, 1995; and
- Smart Battery Selector Specification Revision 1.0, Duracell Inc. and Intel Corporation, Sep. 5, 1996.

The publications listed above are hereby incorporated herein by reference as though fully set forth here.

U.S. patent application Ser. No. 08/850,335 filed May 2, 1997, entitled "Smart Battery Selector" describes a controller IC adapted for inclusion in a portable device. The portable device also includes at least two batteries that are capable of providing battery-state data via a bus to a host computer also included in the portable device. A control electronic-circuit included in the controller directs operation of switch-drivers for selecting among the batteries one of which powers operation of the portable device. A bus-snooper circuit allows the controller to monitor the bus for battery-condition alarm-messages independently of the host computer. The controller may respond to messages on the bus by independently selecting a different battery even if the host computer's operation has been suspended, perhaps to reduce power consumption. The controller disclosed in this patent may also independently select a single battery for charging, and may terminate charging upon receiving a battery overcharge message. The disclosure of the Smart Battery Selector patent application is hereby incorporated by reference.

While the SMBus specification and protocol addresses many significant problems associated with battery powered operation of portable devices, it omits details which are essential to address significant operational constraints involved in battery charging. For example, properly charging a battery requires continuously monitoring the charging current and, if necessary, adjusting operation of the battery charger so a prescribed charging current is supplied to the battery over time. U.S. Pat. No. 5,698,964 entitled "Adaptive Power Battery Charging Apparatus" ("the '964 patent") discloses a battery charger that includes a "buck converter circuit" battery charger having a feedback circuit which regulates battery charging. To permit regulating battery charging current, the circuit disclosed in this patent includes a current sensing resistor, depicted in FIG. 3, connected between a ground terminal of the battery being charged and circuit ground of the battery charger. During charging of the battery, current flowing through the current sensing resistor produces an electrical signal that is proportional to charging current. However, a difficulty encountered with such "low side" current sensing as that illustrated in the '964 patent is that it requires two electrically separate ground circuits, one for normal operation of the battery powered device, and another for battery charging.

U.S. Pat. No. 5,723,970 entitled "Battery Charging Circuitry Having Supply Current Regulation" ("the '970 patent") also discloses a battery charger that includes a feedback circuit which regulates battery charging. However, the feedback circuit disclosed in the '970 patent differs from that disclosed in the '964 patent by having the current sensing resistor located not between a battery ground and a charger ground, but rather between a source of battery charger's electrical energy and the battery being charged. Consequently, the circuit disclosed in the '970 patent is simpler than that disclosed in the '964 patent in the sense that it employs only a single ground that is common both to the battery powered device and to the charger. However, during battery charging the circuit disclosed in the '970 patent experiences a voltage at the "high-side" current sensing resistor which may exceed 16.8 volts ("V"), or may, if the battery is excessively discharged, be as low as 2.5 V. While circuits can be built using comparatively high voltage semiconductor devices or processes which are capable of accommodating this rather wide common-mode voltage range, it is difficult to envision a battery charger IC built using a conventional 5.0 V Complementary Metal-Oxide-Silicon ("CMOS") process that operates consistently throughout this large common-mode voltage range.

BRIEF SUMMARY OF THE INVENTION

An object of the present invention is to provide an improved, high efficiency battery charger IC that senses charging current.

Another object of the present invention is to provide battery charger IC made with a low voltage IC process that senses charging current throughout a wide common-mode voltage range.

Another object of the present invention is to provide battery charger IC having an amplifier for sensing charging current which automatically compensates for drift within the amplifier.

Another object of the present invention is to provide battery charger IC having an amplifier for sensing charging current which automatically compensates for mismatch within the amplifier.

Briefly, the present invention in one aspect is a battery charger IC adapted for controlling operation of a buck converter circuit which may be included in a battery powered device. Such a buck converter circuit receives electrical energy from an external power source and supplies electrical energy for charging the battery. The buck converter circuit includes a series switch that receives an electrical current from the external power source and that supplies an electrical battery charging current to the battery. In accordance with the present invention the buck converter circuit also includes a current-sensing resistor connected in series between the external power source and the battery. Electrical current supplied for charging the battery flows through the current-sensing resistor.

The battery charger IC includes a pulse-width-modulation switch drive circuit that, during charging of the battery, supplies to the buck converter circuit an electrical signal which repeatedly turns-on and then turns-off the series switch. The battery charger IC also includes a charging-current sense amplifier which receives from the current-sensing resistor and amplifies an electrical signal which represents the battery charging electrical current. The charging-current sense amplifier in accordance with the present invention includes a bridge circuit to which is coupled the electrical signal received by the charging-current sense amplifier from the current-sensing resistor. The charging-current sense amplifier also includes an auto-zero circuit which automatically compensates for long-term drift or mismatch occurring within the charging-current sense amplifier.

The present invention in another aspect is a battery powered device that includes a battery for energizing its operation, and a buck converter circuit as described above including the current-sensing resistor. The battery powered device also includes a battery charger IC in accordance with the present invention for controlling operation of the buck converter circuit. The battery charger IC includes the charging-current sense amplifier that receives from the current-sensing resistor and amplifies the electrical signal which represents the battery charging current supplied to the battery. The charging-current sense amplifier includes the bridge circuit and the auto-zero circuit which permit to in accordance with the present invention the battery charger IC, though fabricated with a conventional 5.0 V CMOS process, to accommodate the large common-mode voltage range which may occur at the "high-side" current-sensing resistor.

These and other features, objects and advantages will be understood or apparent to those of ordinary skill in the art from the following detailed description of the preferred embodiment as illustrated in the various drawing figures.

DETAILED DESCRIPTION

Figure 1A:
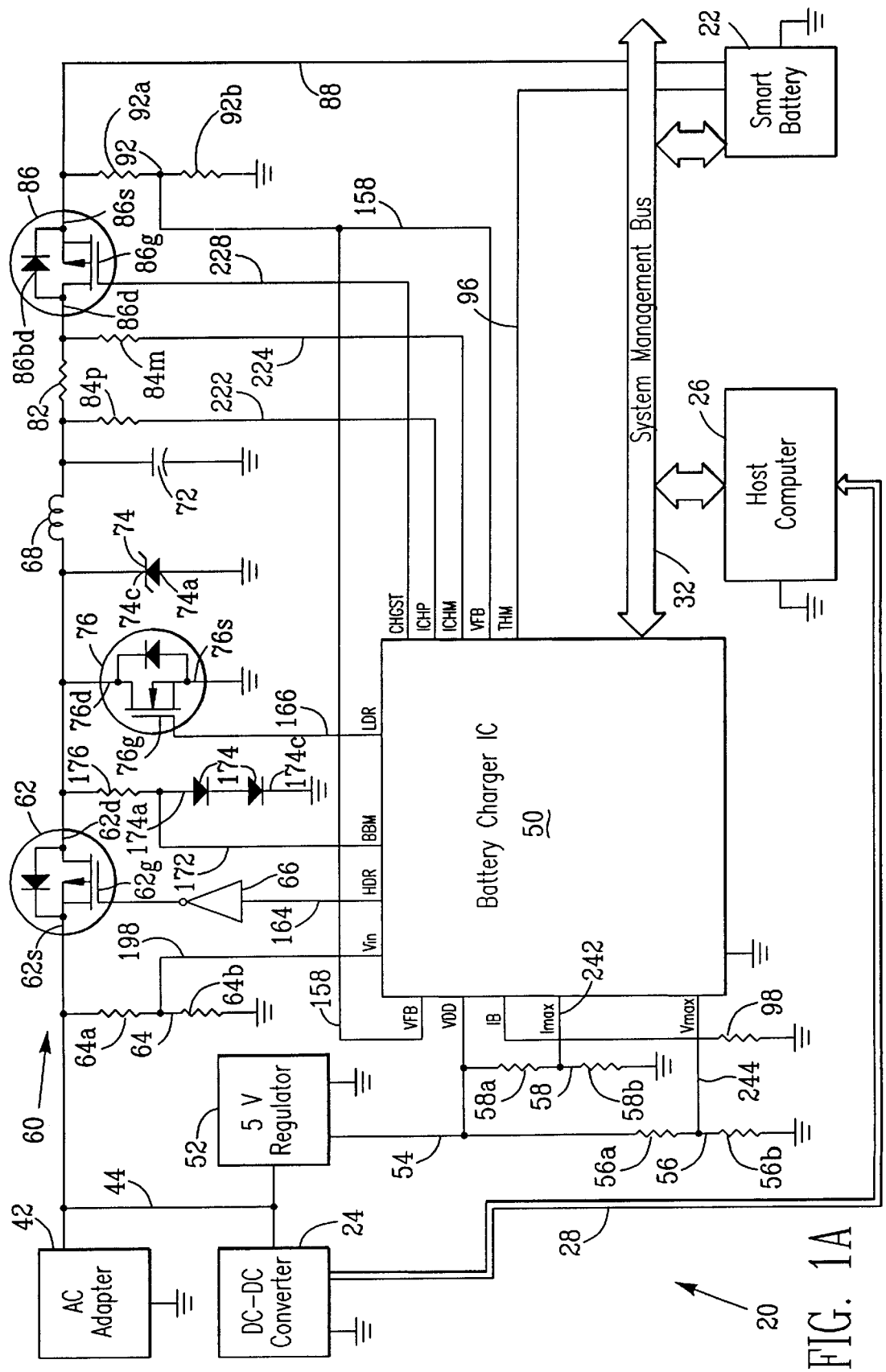
FIGS. 1A and 1B are block diagrams depicting a battery powered device, that respectively omit and include a controller for selecting between a pair of batteries, both of which FIGS. illustrate a battery charger IC in accordance with the present invention.

The block diagram of FIG. 1A illustrates a device, referred to by the general reference character 20, whose operation may be energized by a rechargeable smart battery 22. Though not specifically illustrated in FIG. 1A for pedagogical reasons, when operation of the device 20 is energized by the smart battery 22, the smart battery 22 usually supplies electrical power to a DC—DC converter 24. The DC—DC converter 24 converts such electrical power from the voltage supplied by the smart battery 22 to other voltages required for proper operation by various electronic circuits included in the device 20 such as an IC microprocessor host computer 26. Accordingly FIG. 1A depicts the DC—DC converter 24 as being connected to the host computer 26 by a power supply bus 28.

As is well known to those skilled in the art, generally the host computer 26 may exchange electrical signals with other devices included in the device 20. Depending upon the precise details of the device 20, as is well known to those skilled in the art such devices, none of which are depicted in FIG. 1A, may include a random access memory ("RAM"), a floppy diskette drive, a hard disk drive, a compact disk read only memory ("CD-ROM") drive, a display controller, a PC Card controller, etc. However, the illustration of FIG. 1A specifically depicts the host computer 26 as being capable of exchanging electrical signals with the smart battery 22 via a System Management Bus SM 32. As described above in greater detail, the SMBus 32 permits the smart battery 22, and a computer program executed by the host computer 26, to exchange information regarding the status of the smart battery 22, particularly its charge state.

The block diagram of FIG. 1A depicts the device 20 specifically configured for charging the smart battery 22. Accordingly, the illustration of FIG. 1 includes an AC adaptor 42 that receives alternating current electrical power for energizing the operation of the device 20, including energizing charging of the smart battery 22, from an external power source not depicted in any of the FIGs. In the configuration of the device 20 depicted in FIG. 1A, the AC adaptor 42 supplies electrical energy to the DC—DC converter 24 via an external power line 44. The DC—DC converter 24 in turn supplies that electrical energy to the host computer 26, and to a battery charger IC 50 in accordance with the present invention. The AC adaptor 42 also supplies electrical energy via the external power line 44 to a 5 volt regulator 52. The 5 volt regulator 52 supplies electrical energy at a potential of 5.0 V via a 5 volt supply line 54 directly to the battery charger IC 50 to energize its operation. Because externally supplied electricity energizes the operation of the battery charger IC 50, the battery charger IC 50 ceases operation immediately when the AC adaptor 42 becomes disconnected from the external source of electrical power. For purposes to be described in greater detail below, the 5 volt regulator 52 also supplies electrical energy at a potential of 5.0 V to a maximum-charging-voltage voltage divider 56 assembled from series connected resistors 56a and 56b, and to a maximum-charging-current voltage divider 58 assembled from series connected resistors 58a and 58b.

While charging the smart battery 22, the AC adaptor 42 also supplies electrical energy via the external power line 44 to a high charging-current, pulse-width-modulated ("PWM") buck converter circuit identified in FIG. 1A by the general reference character 60. Accordingly, a source terminal 62s of a series switch 62 included in the PWM buck converter circuit 60 receives electrical power directly from the AC adaptor 42. As illustrated in FIG. 1A, the series switch 62 is preferably a P-type MOSFET. The external power line 44 also connects to circuit ground via a voltage divider 64 assembled from series connected resistors 64a and 64b. The junction of the resistors 64a and 64b supplies the battery charger IC 50 with a reference voltage that is proportional to the voltage supplied by the AC adaptor 42 as present on the external power line 44.

During charging of the smart battery 22, an electrical signal, supplied to a gate terminal 62g of the series switch 62 from the battery charger IC 50 via an inverting amplifier 66, repeatedly turns the series switch 62 first on and then off. A drain terminal 62d of the series switch 62 connects to an inductor 68. During charging of the smart battery 22, while the series switch 62 is turned-on, the drain terminal 62d supplies an electrical current to the inductor 68. During each successive interval in which the series switch 62 is turned-on, electrical current flowing through the inductor 68 increases until the series switch 62 is turned-off. During each successive interval in which the series switch 62 is turned-off, electrical current flowing through the inductor 68 decreases either until electrical current stops flowing through the inductor 68, or until the series switch 62 is again turned on.

While the series switch 62 is turned-on, some of the electrical current flowing through the inductor 68 enters a filter capacitor 72. While the series switch 62 is turned-off, electrical current flows out of the filter capacitor 72. During each successive interval in which the series switch 62 is turned-off while electrical current through the inductor 68 decreases, electrical current flows into the inductor 68 from a free-wheeling zener diode 74. Accordingly, a cathode terminal 74c of the free-wheeling zener diode 74 connects to the junction between the drain terminal 62d of the series switch 62 and the inductor 68, while an anode terminal 74a of the free-wheeling zener diode 74 connects to circuit ground.

To reduce power loss in the PWM buck converter circuit 60 due to electrical current flowing through the free-wheeling zener diode 74, the PWM buck converter circuit 60 also includes a synchronous-rectifier switch 76, preferably a N-type MOSFET, connected in parallel with the free-wheeling zener diode 74. A source terminal 76d of the synchronous-rectifier switch 76 connects to circuit ground, and a drain terminal 76d of the synchronous-rectifier switch 76 connects to the junction among the drain terminal 62d of the series switch 62, the inductor 68 and the cathode terminal 74c of the free-wheeling zener diode 74. During charging of the smart battery 22, an electrical signal supplied to a gate terminal 76g of the synchronous-rectifier switch 76 from the battery charger IC 50 repetitively turns the synchronous-rectifier switch 76 on after the series switch 62 turns-off, and then turns the synchronous-rectifier switch 76 off before turning the series switch 62 on. To protect the synchronous-rectifier switch 76 from an inadvertent application of an excessively high voltage between the junction among the drain terminal 76*d* of the synchronous-rectifier switch 76, the drain terminal 62*d* of the series switch 62 and the terminal of the inductor 68 and circuit ground while permitting proper operation of the PWM buck converter circuit 60, usually the free-wheeling zener diode 74 has a zener breakdown voltage of approximately 40 V to 50 V.

A current-sensing resistor 82 connects in series with the inductor 68 at the junction between the inductor 68 and the filter capacitor 72. The voltages present respectively at opposite terminals of the current-sensing resistor 82 during charging of the smart battery 22 are supplied through isolation resistors 84*p* and 84*m* to the battery charger IC 50. The isolation resistors 84*p* and 84*m* preferably have a resistance of 1 megohm ("MΩ"), and are matched to within 0.1%.

A terminal of the current-sensing resistor 82 furthest from the inductor 68 connects to a drain terminal 86*d* of a reverse-current-protection switch 86, preferably a P-type MOSFET. A source terminal 86*s* of the reverse-current-protection switch 86 supplies the smart battery 22 with the charging current via battery-charging-current line 88. During charging of the smart-battery 22, if the battery charging current exceeds a pre-established threshold an electrical signal supplied to a gate terminal 86*g* of the reverse-current-protection switch 86 by the battery charger IC 50 turns the reverse-current-protection switch 86 on to provide a low resistance path between the PWM buck converter circuit 60 and the smart battery 22. When the battery charging current decreases below the pre-established threshold, the electrical signal supplied by the battery charger IC 50 turns the reverse-current-protection switch 86 off, and the charging current flows from the PWM buck converter circuit 60 to the smart battery 22 via a drain body diode 86*db* of the reverse-current-protection switch 86. Consequently, for charging currents less than the threshold below which the reverse-current-protection switch 86 is turned-off, the drain terminal 86*d* blocks any possible reverse current flowing from the smart battery 22 into the PWM buck converter circuit 60.

A feedback voltage divider 92, assembled from series connected resistors 92*a* and 92*b*, connects between the battery-charging-current line 88 and circuit ground. The junction of the resistors 92*a* and 92*b* supplies the battery charger IC 50 with a feed-back voltage signal that is proportional to the voltage feed-back ("VFB") signal present on the battery-charging-current line 88 and applied across the smart battery 22 during charging.

In addition to the connection between the smart battery 22 and the battery charger IC 50 via the SMBus 32, a thermistor signal-line 96 also supplies the battery charger IC 50 with an electrical signal produced by a thermistor included in the smart battery 22 in accordance with the SMBus specification. A bias-current-programming resistor 98 also couples a terminal of the battery charger IC 50 to circuit ground.

Figure 1B:
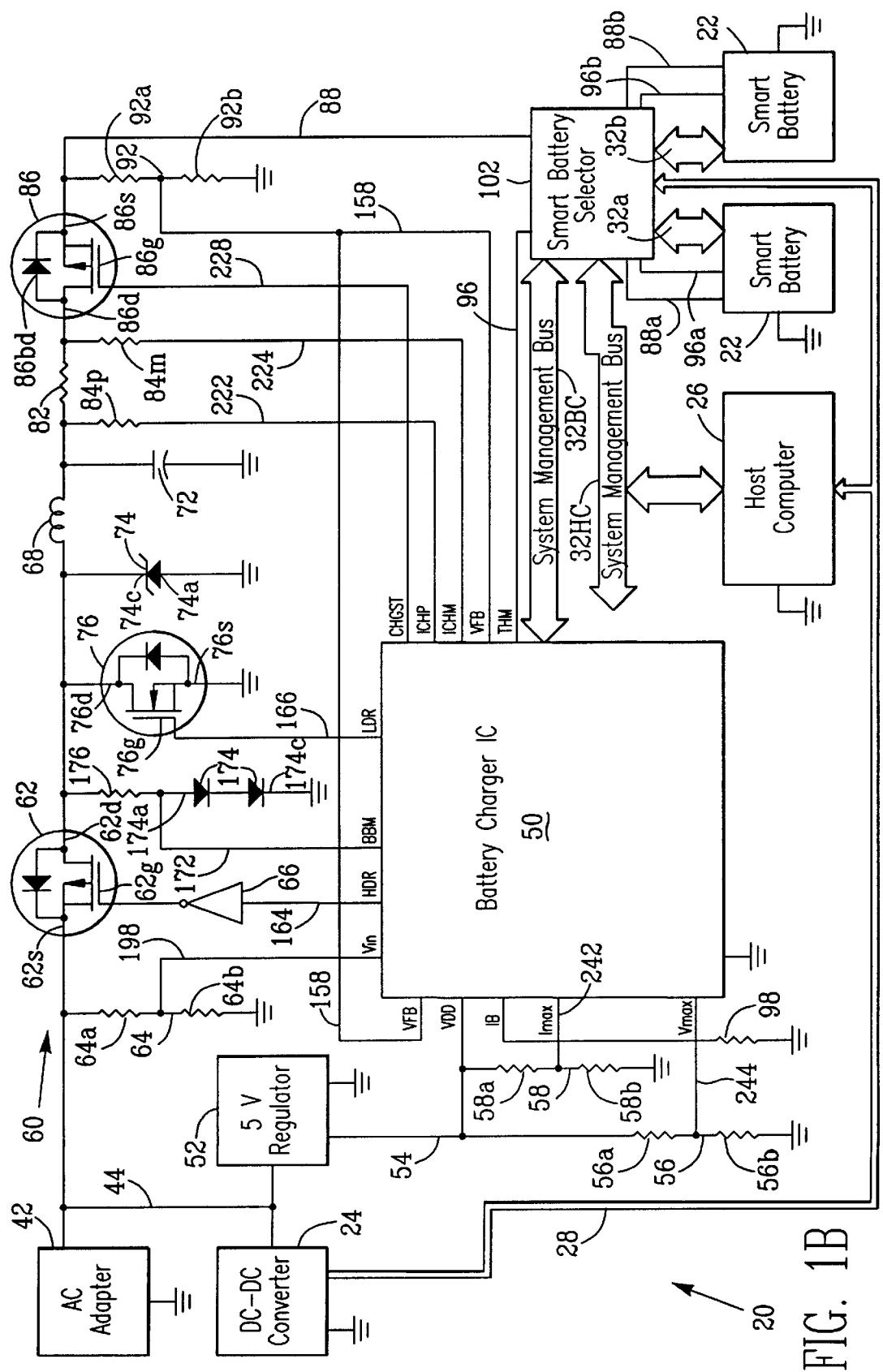

The block diagram of FIG. 1B depicts a device 20 which differs from the device 20 depicted in FIG. 1A by being specifically configured to include a smart battery selector 102 such as that described in the Smart Battery Selector patent application. As indicated in FIG. 1B, the smart battery selector 102 provides a terminus for both the battery-charging-current line 88 and the thermistor signal-line 96. As indicated in the illustration of FIG. 1B, the smart battery selector 102 also conceptually subdivides the SMBus 32 into a battery-charger segment 32*bc* and a host-computer segment 32*hc*. SMBus segments 32*a* or 32*b* respectively interconnect the smart battery selector 102 with the smart batteries 22. Accordingly, the smart battery selector 102 conveys SMBus communications between the smart battery 22 being charged and the battery charger IC 50 via the battery-charger segment 32*bc* and one or the other of SMBus segments 32*a* or 32*b*. Correspondingly, the smart battery selector 102 conveys SMBus communications between the smart battery 22 that is not being charged and the host computer 26 via the host-computer segment 32*hc* and one or the other of SMBus segments 32*a* or 32*b*. Analogously, the smart battery selector 102 supplies battery charging current to one or the other of the smart batteries 22 via battery-charging-current line-segments 88*a* or 88*b*. Finally, the smart battery selector 102 also selects via either thermistor signal-line-segment 96*a* or 96*b* a temperature signal from a thermistor included in the smart battery 22 being charged, and supplies that temperature signal via the thermistor signal-line 96 to the battery charger IC 50.

Figure 2:
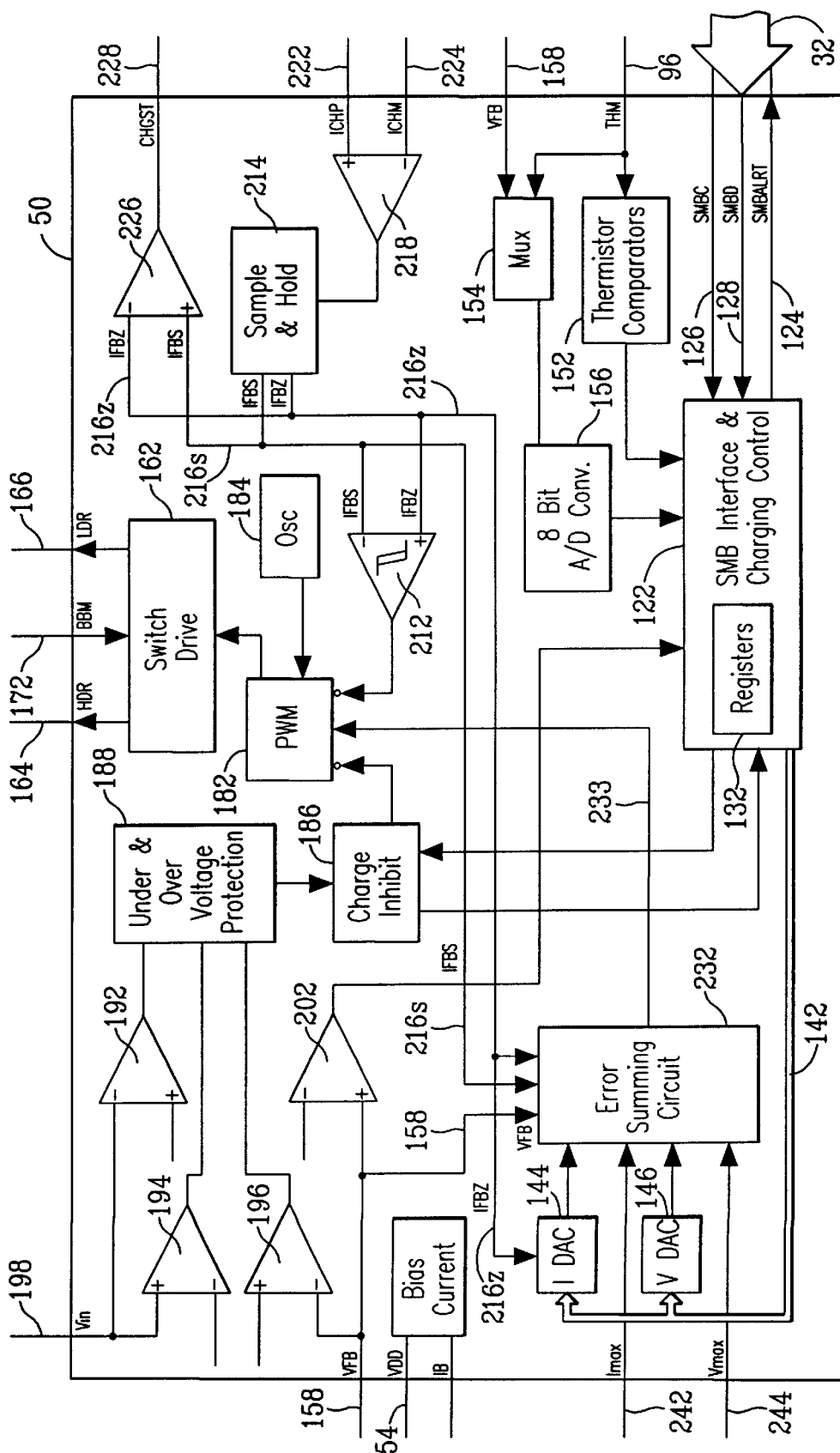
FIG. 2, is a block diagram depicting in greater detail the battery charger IC depicted in FIGS. 1A and 1B that includes a SMB interface and charging control, an error summing circuit, a charging-current sense amplifier, and a sample-and-hold circuit.
Figure 3:
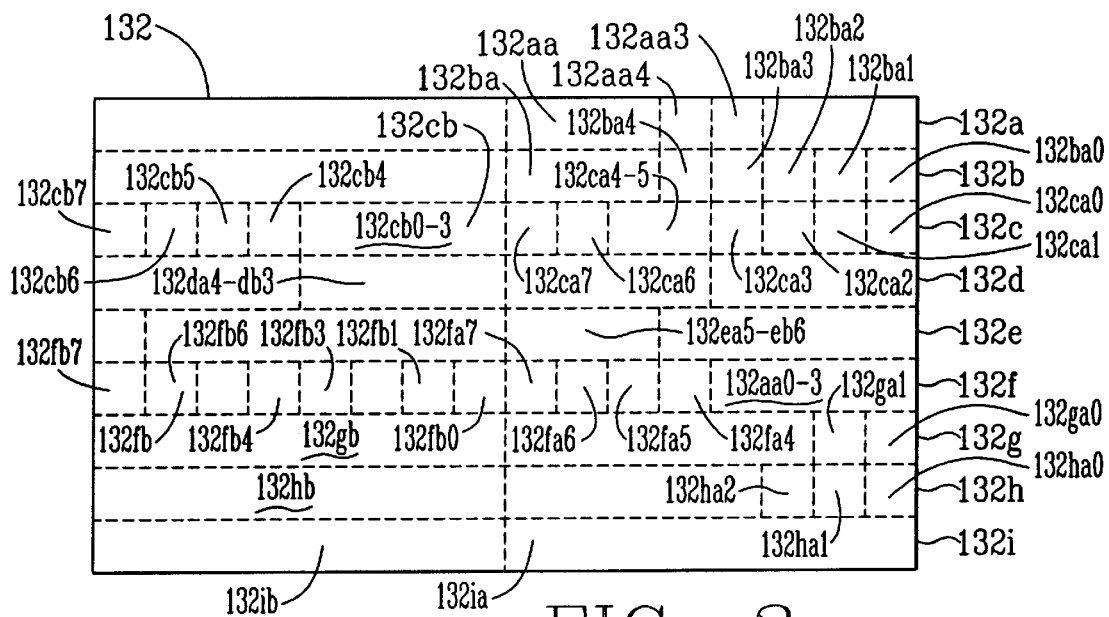
FIG. 3 is a register diagram depicting a register block included in the SMB interface and charging control depicted in FIG. 2.

As depicted in the block diagram of FIG. 2, the battery charger IC 50 includes a SMB interface and charging control 122. In accordance with the SMB protocol, the SMB interface and charging control 122 may transmit an ALRT signal, i.e. an interrupt, to other devices connected to the SMBus 32 via a SMBALRT line 124 included in the SMBus 32. The SMB interface and charging control 122 receives, via a SMB clock ("SMBC") line 126 included in the SMBus 32, a clock signal transmitted from a master device connected to the SMBus 32, e.g. the host computer 26 or the smart battery 22. Responsive to the clock signal present on the SMBC line 126, the SMB interface and charging control 122 exchanges data with other devices connected to the SMBus 32, e.g. the host computer 26 or the smart battery 22, via a SMBD line 128. Such inter-device communications may selectively cause data to be written into and/or read from a set nine (9) registers included in an interface register block 132 of the SMB interface and charging control 122. FIG. 3 depicts registers 132*a*–132*i* included in the interface register block 132 which comprise:

1. a read only chargerspecinfo register 132*a*;
2. a write only charger-mode register 132*b*;
3. a read only charger-status register 132*c*;
4. a read/write charging-current register 132*d*;
5. a read/write charging-voltage register 132*e*;
6. a write only alarm-warning register 132*f*;
7. a read only battery-temperature register 132*g*;
8. a read only battery-voltage register 132*h*; and
9. a read only chipinfo register 132*i*.

ChargerSpecInfo Register 132*a*

The read only chargerspecinfo register 132*a* stores extended status bits which specify performance capabilities of the battery charger IC 50. Bit 132*aa*3 located in the low nibble 132*aa* of the chargerspecinfo register 132*a* stores data indicating the applicable version of the specification for the battery charger IC 50. Bit 132*aa*4 stores data indicating whether the battery charger IC 50 supports commands for the optional smart battery selector 102.

Charger Mode Register 132*b*

The write only charger-mode register 132*b* stores data which specifies various operating modes for the battery charger IC 50. Values assigned to bits in the charger-mode register 132*b* upon b 10resetting the battery charger IC 50 permit the battery charger IC 50 to operate in concert with the smart battery 22 without intervention of the host computer 26. Bit 132ba0 stores data which enables or disables battery charging without altering previously specified battery charging current and voltage values. Battery charging may be resumed by resetting bit 132ba0. Bit 132ba 0 is automatically cleared if power is re-applied to the battery charger IC 50, or if the smart battery 22 is inserted into the device 20. Bit 132ba1 stores data which specifies whether battery charging is to be controlled by data which the battery charger IC 50 receives from the smart battery 22, or from a computer program executed by the host computer 26. Setting bit 132ba2 in the charger-mode register 132b resets the battery charger IC 50 to its power-on condition. Setting bit 132ba3 in the low nibble 132ba of the charger-mode register 132b resets to zero data stored in charging-current register 132d and charging-voltage register 132e which specify battery charging current and voltage values. Bit 132b a4 stores data which specifies whether battery charging is to continue for an unlimited interval of time, or whether battery charging will terminate after a pre-established time interval, e.g. after 3 minutes.

Charger Statuns Register 132c

The read only charger-status register 132c stores data specifying the status of the battery charger IC 50. Bit 132ca0 stores data that indicates whether the charger is enabled or disabled as specified by bit 132ba0. Bit 132ca1 stores data that indicates whether charging is controlled by data which the battery charger IC 50 receives from the smart battery 22. If the battery charger IC 50 is operating in response to data received from the smart battery 22, then bit 132cal is set to zero. Bit 132ca2 stores data that indicates whether or not the battery charger IC 50 has detected that a specified charging voltage is being applied across the smart battery 22. Bit 132ca3 stores data that indicates whether or not the charger has detected that a specified charging current is being supplied to charge the smart battery 22. Bits 132ca4 and 132ca5 store data that indicate what device controls operation of the battery charger IC 50. These two data (2) bits are set to "01" if the battery charger IC 50 is operating in response to data received from the smart battery 22. The two data (2) bits are set to "11" if the battery charger IC 50 is operating in response to data received from the host computer 26. Bit 132ca6 stores data that indicates whether the charging current value specified in the charging-current register 132d exceeds the maximum current that may be supplied for charging the smart battery 22. Bit 132ca7 stores data that indicates whether the charging voltage value specified in the charging-voltage register 132e exceeds the maximum voltage that may be applied while charging the smart battery 22. Bits 132cb0 through 132cb3 store data received from thermistor comparators 152 depicted in FIG. 2 that indicate ranges of resistance value for the thermistor included in the smart battery 22. Specifically, bits 132cb0 through 132cb2 indicate whether the thermistor included in the smart battery 22 has a temperature below, between or above pre-established temperature values. Bit 132cb4 located in the high nibble 132cb of the charger-status register 132c stores data that indicates whether a valid alarm message received from the smart battery 22 has caused the battery charger IC 50 to inhibit battery charging. This bit is reset if new values are specified both for charging voltage and charging current, if power is removed from the battery charger IC 50, or if the smart battery 22 is removed from the device 20. Bit 132cb5 stores data that indicates whether battery voltage exceeds a maximum hardware preset battery voltage value. This bit generally indicates a catastrophic fault in the device 20. Bit 132cb6 stores data that indicates whether a smart battery 22 is present in the device 20. Bit 132cb7 stores data that indicates whether the voltage present on the external power line 44 exceeds 7.0 V.

Charging Current Register 132d

Bits 132da4–db3 of the read/write charging-current register 132d store data which specifies a battery charging current. The battery charger IC 50 receives the data present in the bits 132da4–db3 from the host computer 26, from the smart battery 22, or from some other master device connected to the SMBus 32. The data stored in bits 132da4–db3 of the read/write charging-current register 132d are transmitted from the SMB interface and charging control 122 via a DAC data bus 142, illustrated in FIG. 2, to a current ("I") digital-to-analog converter ("DAC"), i.e. I DAC 144, to limit the maximum charging current supplied to the smart battery 22. The battery charger IC 50 responds to specification of a maximum charging current either by supplying the specified current to the smart battery 22 if that current value is below a pre-estab- lished maximum for the battery charger IC 50, or by supplying the pre-established maximum current to the smart battery 22 if the current value specified by 132da4–db3 exceeds that maximum permitted current.

Charging Voltage Register 132e

Analogous to the charging-current register 132d, bits 132ea5–eb6 of the read/write charging-voltage register 132e store data which specifies a maximum battery charging voltage. The battery charger IC 50 receives the data present in the bits 132ea5–eb6 from the host computer 26, from the smart battery 22, or from some other master device connected to the SMBus 32. The data stored in bits 132ea5–eb6 of the read/write charging-voltage register 132e are transmitted from the SMB interface and charging control 122 via the DAC data bus 142 to a V DAC 146 to limit the maximum voltage applied during charging of the smart battery 22. The smart battery 22 can effectively turn off the battery charger IC 50 by storing a value of zero (0) into bits 132ea5–eb6 of the read/write charging-voltage register 132e. The battery charger IC 50 responds to specification of a maximum charging voltage either by supplying the voltage specified by data present in the bits 132ea5–eb6 if that voltage value is below a pre-established maximum for the battery charger IC 50, or by supplying the pre-established maximum voltage to the smart battery 22 if the voltage value specified by 132da4–db3 exceeds that maximum permitted voltage.

Alarm Warning Regaister 12f

If an alarm condition occurs in the smart battery 22, data about the alarm condition is stored as individual bits in a status register included in the smart battery 22. Upon the occurrence of one or more alarm conditions, the smart battery 22, then acting as a master device on the SMBus 32, may send an alarm warning message containing this data to the battery charger IC 50, or to the host computer 26. The smart battery 22 sends all alarm conditions to the host computer 26, but sends only charging related alarms to the battery charger IC 50. Alarm condition messages which the smart battery 22 sends to the host computer 26 may be used by a computer program executed by the host computer 26 to alert a user about the alarm condition then existing in the smart battery 22. Under such circumstances, a power management computer program executed by the host computer 26 and the battery charger IC 50 are responsible for processing the alarm and taking appropriate action. If the smart battery 22 sends alarm condition data to the battery charger IC 50, the battery charger IC 50 stores that data in the write only alarm-warning register 132f. Although the alarm-warning register 132f replicates all fifteen (15) bits of the status register present in the smart battery 22, the battery charger IC 50 responds to only bits 132fb4 through 132fb7 by immediately terminating charging if an alarm warning message from the smart battery 22 sets any bit or combinations of bits in the high nibble 132fb of the alarm-warning register 132f.

Bits 132fa0–fa3 store an alarm code transmitted by the smart battery 22. Bit 132fa4 stores data indicating that the smart battery 22 is discharged. Bit 132fa5 stores data indicating that the smart battery 22 is fully charged. Bit 132fa6 stores data indicating the smart battery 22 is discharging. Bit E132fa7 stores data indicating that the smart battery 22 is initializing. Bit 132fb0 stores data indicating that a remaining time alarm has occurred in the smart battery 22. Bit 132fb1 stores data indicating that a remaining capacity alarm has occurred in the smart battery 22. Bit 132fb3 stores data indicating that a terminate discharge alarm has occurred in the smart battery 22. Bit 132fb4 stores data indicating that a over temperature alarm has occurred in the smart battery 22. Bit 132fb6 stores data indicating that a terminate charge alarm has occurred in the smart battery 22. Bit 132fb7 stores data indicating that an over charged alarm has occurred in the smart battery 22.

Battery Temperate Register 132g

The read only battery-temperature register 132g stores data that indicates battery temperature as sensed by the thermistor included in the smart battery 22. By reading data present in the battery-temperature register 132g a computer program executed by the host computer 26 can ascertain the temperature of the smart battery 22. Bit 132ga0 indicates whether the data value for thermistor voltage present in the battery-temperature register 132g is valid or invalid. Bit 132ga1 indicates that a value for thermistor voltage is presently being measured by an analog-to-digital converter 156 included in the battery charger IC 50 that is depicted in FIG. 2. A high nibble 132gbof the battery-temperature register 132g stores data which indicates the thermistor voltage as measured by the analog-to-digital converter 156.

Battery Voltage Register 132h

Analogous to the battery-temperature register 132g, the read only battery-voltage register 132h stores data which a computer program executed by the host computer 26 may read to ascertain the voltage then present across the smart battery 22. Bit 132ha0 indicates if the analog-to-digital converter 156 included in the battery charger IC 50 has completed measuring the voltage across the smart battery 22. Bit 132ha1 indicates whether the analog-to-digital converter 156 is presently measuring the voltage across the smart battery 22 Bit 132ha2 indicates if the pre-established time interval for battery charging, described above in connection with bit 132ba2, has expired. A high nibble 132hbof the battery-voltage register 132h stores data which indicates the voltage across the smart battery 22 as measured by the analog-to-digital converter 156.

ChipInfo Register 132i

A low nibble 132ia of the read only chipinfo register 132i stores data which provides an ID for the battery charger IC 50. A high nibble 132ib of the chipinfo register 132i stores data which provides a revision level for the battery charger IC 50.

Referring again to FIG. 2, the battery charger IC 50 includes a multiplexer 154 having an output which supplies one or the other of two selectable signals to an analog-to-digital converter 156 for digitization. Inputs to the multiplexer 154 respectively receive the signal from the thermistor, transmitted to the battery charger IC 50 via the thermistor signal-line 96, or the feed-back voltage signal from the feedback voltage divider 92, transmitted to the battery charger IC 50 via a voltage feedback signal line 158.

In this way the battery-temperature register 132g and the battery-voltage register 132h, included in the SMB interface and charging control 122, respectively receive from the analog-to-digital converter 156 digital data that respectively represents the voltage produced by the thermistor included in the smart battery 22, and the voltage applied across the smart battery 22 during charging.

The battery charger IC 50 also includes a switch drive 162 that supplies signals for controlling the operation of the PWM buck converter circuit 60. Accordingly, the switch drive 162 supplies, via a HDR signal line 164 to an input of the inverting amplifier 66, a signal for turning the series switch 62 on and then off. Similarly, the switch drive 162 supplies a signal for turning the synchronous-rectifier switch 76 first off and then on via a LDR signal line 166.

To ensure that the synchronous-rectifier switch 76 does not turn-on before the series switch 62 turns-off and conversely, the switch drive 162 receives a break-before-make signal via a BBM signal line 172. The BBM signal line 172 connects to an anode 174a of a first of a pair of series connected diodes 174 depicted in FIGS. 1A and 1B. A cathode 174c of a second of the diodes 174 connects to circuit ground. One terminal of a resistor 176 connects to a junction between the BBM signal line 172 and the anode 174a. A second terminal of the resistor 176 connects to the junction among the drain terminal 62d of the series switch 62, one terminal of the inductor 68, the cathode terminal 74c of the free-wheeling zener diode 74, and the drain terminal 76d of the synchronous-rectifier switch 76. Accordingly, while the series switch 62 is turned-on and the synchronous-rectifier switch 76 is turned-off, the break-before-make signal received by the switch drive 162 via the BBM signal line 172 has a potential of approximately +1.0 V. While the series switch 62 is turned-off and the synchronous-rectifier switch 76 is turned-on, the break-before-make signal received by the switch drive 162 via the BBM signal line 172 has a potential that does not exceed approximately −0.5 V. Alternation of the signal present on the BBM signal line 172 between these two voltages permits the switch drive 162 to ensure that the signal supplied via the LDR signal line 166 does not turn the synchronous-rectifier switch 76 on before the series switch 62 actually turns-off, and that the signal supplied via the HDR signal line 164 does not turn the series switch 62 on before the synchronous-rectifier switch 76 actually turns-off.

The switch drive 162 receives from a pulse-width-modulation ("PWM") circuit 182 included in the battery charger IC 50 a charger control signal which establishes a time interval during which the series switch 62 will be turned-on if the synchronous-rectifier switch 76 is turned-off, and during which the synchronous-rectifier switch 76 will be turned-on if the series switch 62 is turned-off. An oscillator 184 supplies a 220 KHz signal to the PWM circuit 182 for clocking that circuit's operation. The PWM circuit 182 also receives a digital signal from a charge-inhibit circuit 186. The state of the signal which the PWM circuit 182 receives from the charge-inhibit circuit 186 determines whether the P14M circuit 182 is enabled for supplying the charger control signal to the switch drive 162 thereby activating operation of the PWM buck converter circuit 60, or is disabled so the PWM circuit 182 does not supply the charger control signal to the switch drive 162 thereby deactivating operation of the PWM buck converter circuit 60.

The charge-inhibit circuit 186 receives a digital signal controlled by the state of bit 132ba0 in the charger-mode register 132b of the interface register block 132 to permit enablement or disablement of battery charging by a computer program executed by the host computer 26. If bit 132ba0 is reset, then the signal which the charge-inhibit circuit 186 receives from the SMB interface and charging control 122 enables the charge-inhibit circuit 186 for transmitting a signal to the PWM circuit 182 which activates operation of the PWM buck converter circuit 60 for charging the smart battery 22. Conversely, if bit 132ba0 is reset, then the signal which the charge-inhibit circuit 186 transmits to the PWM circuit 182 causes the PWM circuit 182 to deactivate operation of the PWM buck converter circuit 60. However, even if the signal which the charge-inhibit circuit 186 receives from the SMB interface and charging control 122 enables operation of the PWM buck converter circuit 60 for charging the smart battery 22, a digital signal supplied to the charge-inhibit circuit 186 by an under-and-over voltage-protection circuit 188 may also inhibit operation of the PWM circuit 182 so the PWM buck converter circuit 60 doesn't charge the smart battery 22.

The digital signal which the under-and-over voltage-protection circuit 188 supplies to the charge-inhibit circuit 186 for enabling or disabling operation of the PWM buck converter circuit 60 combines signals from three (3) comparators 192–196 included in the battery charger IC 50. Input terminals of the comparators 192 and 194 receive, via a Vin signal line 198, a signal from the voltage divider 64 which is proportional to the voltage present on the external power line 44. Pre-established reference voltages respectively supplied to other input terminals cause the comparators 192 and 194 to transmit output signals to the under-and-over voltage-protection circuit 188 which enable operation of the PWM buck converter circuit 60 for charging the smart battery 22 if the voltage present on the external power line 44 is between 7.0 and 25.0 V. If the voltage present on the external power line 44 is below 7.0 V or greater than 25.0 V, then output signals transmitted by the comparators 192 and 194 to the under-and-over voltage-protection circuit 188 inhibit operation of the PWM buck converter circuit 60 for charging the smart battery 22. The charge-inhibit circuit 186 also transmits a signal to the interface register block 132 included in the SMB interface and charging control 122 that indicates whether the under-and-over voltage-protection circuit 188 has detected a condition in the voltages present on the voltage feedback signal line 158 or on the the Vin signal line 198 which result in the charge-inhibit circuit 186 enabling or inhibiting battery charging.

Analogously, an input terminal of the comparator 196 receives the feed-back voltage signal from the feedback voltage divider 92 via the voltage feedback signal line 158. A pre-established voltage applied to another input terminal causes the comparator 196 to transmit a signal to the under-and-over voltage-protection circuit 188 for inhibiting operation of the PWM buck converter circuit 60 for charging the smart battery 22 if the VFB voltage present on the battery-charging-current line 88 indicates a battery voltage less than 1.5 V.

The feed-back voltage signal from the feedback voltage divider 92 is also supplied as an input signal to another comparator 202. A pre-established voltage applied to another input terminal causes the comparator 202 to transmit a signal to the SMB interface and charging control 122 which activates a "wake-up" operating mode of the battery charger IC 50 if the VFB voltage present on the battery-charging-current line 88 is less than 10.0 V. Such a low VFB voltage may occur if the smart battery 22 is excessively discharged, or if there is a short-circuit between the battery-charging-current line 88 and circuit ground. To protect the PWM buck converter circuit 60 from damage by a short-circuit while permitting the PWM buck converter circuit 60 to recharge an excessively discharged smart battery 22, immediately following resetting of the battery charger IC 50 upon receiving the (isnal from the comparator 202 which indicates the battery voltage is less than 10.0 V the wake-up operating mode of the battery charger IC 50 programs the charger current and voltage limit data values stored respectively in the charging-current register 132d and the charging-voltage register 132e of the interface register block 132 to a current of 256 milliamperes ("ma") and 32.0 volts. Establishing these limits for current and voltage supplied by the PWM buck converter circuit 60 to the battery-charging-current line 88 permits charging of an excessively discharged smart battery 22 while concurrently protecting the PWM buck converter circuit 60 from a short-circuit condition.

In addition to the digital signal supplied by the charge-inhibit circuit 186 to the PWM circuit 182 that inhibits or enables operation of the PWM buck converter circuit 60 for charging the smart battery 22, a digital signal supplied by a schmidt trigger circuit 212 to the PWM circuit 182 may also inhibit operation of the PWM buck converter circuit 60. The signal which the schmidt trigger circuit 212 supplies to the PWM circuit 182 inhibits operation of the PWM buck converter circuit 60 if a pair of charging current feed back signals ("IFBZ" and "IFBS") indicate that the charging current is less than a pre-establish threshold. The schmidt trigger circuit 212 provides a safety backup feature, that complements the blocking by the drain terminal 86d of any possible reverse current flowing from the smart battery 22 into the PWM buck converter circuit 60, by inhibiting operation of the PWM circuit 182 for charging currents less than the threshold pre-established by the schmidt trigger circuit 212. Accordingly, an inverting input terminal of the schmidt trigger circuit 212 receives the IFBS signal from a sample-and-hold circuit 214 via an IFBS signal line 216s. A non-inverting input terminal of the schmidt trigger circuit 212 receives the IFBZ signal via an IFBZ signal line 216z, and internally within the schmidt trigger circuit 212 adds to the IFBZ signal a pre-established voltage. The sum of the IFBZ signal plus the pre-established voltage is used within the schmidt trigger circuit 212 as a threshold for inhibiting operation of the PWM buck converter circuit 60 for charging the smart battery 22.

To provide the schmidt trigger circuit 212 with the IFBZ and IFBS signals the battery charger IC 50 includes a charging-current sense amplifier 218 having an output terminal that is coupled to the sample-and-hold circuit 214. Input terminals of the charging-current sense amplifier 218, in turn, respectively receive an ICHP signal and an ICHM signal from opposite terminals of the current-sensing resistor 82 respectively via an ICHP signal line 222 and an ICHM signal line 224. The difference in voltage between the ICHP and ICHM signals is proportional to the charging current supplied to the smart battery 22. As explained in greater detail below, at different times the voltage of the signal which the charging-current sense amplifier 218 supplies to the sample-and-hold circuit 214 alternatively represents zero current flowing through the current-sensing resistor 82, or represents the battery charging current actually flowing through the current-sensing resistor 82. The sample-and-hold circuit 214 stores both the zero charging current and the battery charging current signals, and transmits both of them to the schmidt trigger circuit 212 respectively via the IFBS and IFBZ signal lines 216s and 216z. Thus, the difference between the signals present on the IFBS and IFBZ signal lines 216s and 216z is proportional to the battery charging current flowing through the current-sensing resistor 82.

In addition to supplying the IFBS and IFBZ signals to the schmidt trigger circuit 212, the sample-and-hold circuit 214 also supplies them to input terminals of a comparator 226 included in the battery charger IC 50. Similar to the schmidt trigger circuit 212, an inverting input terminal of the comparator 226 receives the IFBZ signal and internally adds a pre-established voltage to the IFBZ signal to obtain a voltage for comparison with the voltage of the IFBS signal applied to a non-inverting input terminal of the comparator 226. Consequently, if the IFBS and IFBZ signals transmitted by the sample-and-hold circuit 214 indicate that the charging current flowing through the current-sensing resistor 82 exceeds a pre-established threshold, then the comparator 226 transmits a CHGST signal to the gate terminal 86g of the reverse-current-protection switch 86 via a CHGST signal line 228 to turn the reverse-current-protection switch 86 on thereby establishing a low electrical resistance path between the PWM buck converter circuit 60 and the smart battery 22.

Figure 4:
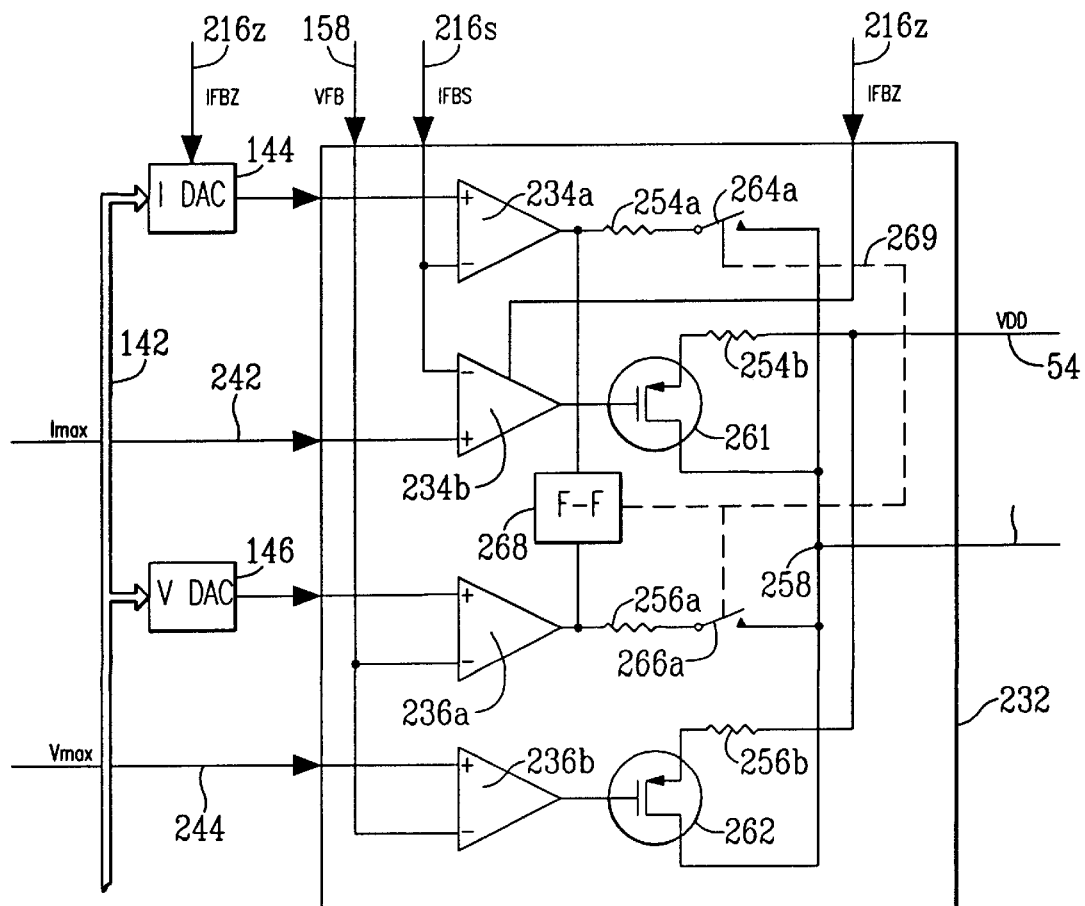
FIG. 4 is a block diagram depicting the error summing circuit depicted in FIG. 2.

In addition to receiving various digital signals for enabling or inhabiting operation of the PWM buck converter circuit 60 from the SMB interface and charging control 122, from the charge-inhibit circuit 186 and from the schmidt trigger circuit 212, the PWM circuit 182 also receives an analog signal from a error summing circuit 232, depicted in greater detail in FIG. 4, via a charging-control signal line 233. This analog signal controls on-time interval and off-time interval of the HDR and LDR signals produced by the switch drive 162 while the PWM buck converter circuit 60 charges the smart battery 22. As depicted in FIG. 4, the error summing circuit 232 includes a pair of charging-current error amplifiers 234a and 234b, and a pair of charging-voltage error amplifiers 236a and 236b.

Input terminals of each of the charging-current error amplifiers 234a and 234b respectively receive the IFBS signal from the sample-and-hold circuit 214 via the IFBS signal line 216s. Another input terminal of the charging-current error amplifier 234a receives an output signal from the I DAC 144 which also receives the IFBZ signal from the sample-and-hold circuit 214 via the IFBZ signal line 216z. The signal which the I DAC 144 supplies to the charging-current error amplifier 234a is the sum of the voltage specified by data stored in the bits 132da4–db3 of the charging-current register 132d of the interface register block 132 plus the IFBZ signal. If the difference between the IFBS and IFBZ signals exceeds that specified by the data stored in the bits 132da4–db3, then the output signal from the charging-current error amplifier 234a has one pre-established value. Conversely, if the difference between the IFBS and IFBZ signals is less than that specified by the data stored in the bits 132da4–db3, then the output signal from the charging-current error amplifier 234a has a different pre-established value.

The input terminal of the charging-current error amplifier 234b which does not receive the IFBS signal receives an Imax signal from the maximum-charging-current voltage divider 58 via an Imax signal line 242. The charging-current error amplifier 234b also receives the IFBZ signal from the sample-and-hold circuit 214 via the IFBZ signal line 216z. Internally within the charging-current error amplifier 234b the voltage present on the Imax signal line 242 is added to the voltage present on the IFBZ signal line 216z to establish a threshold for comparison with the IFBS signal. If the difference between the IFBS and IFBZ signals exceeds the Imax signal voltage, then the output signal from the charging-current error amplifier 234b has one pre-established value. Conversely, the difference between the IFBS and IFBZ signals is less than the Imax signal voltage, then the output signal from the charging-current error amplifier 234b has a different pre-established value.

Input terminals of each of the charging-voltage error amplifiers 236a and 236b respectively receive the VFB signal from the feedback voltage divider 92 via the voltage feedback signal line 158. Another input terminal of the charging-voltage error amplifier 236a receives an output signal from the V DAC 146 whose value is determined by data stored in the bits 132ea5–eb6 of the charging-voltage register 132e of the interface register block 132. If the VFB signal voltage exceeds the voltage supplied to the charging-voltage error amplifier 236a by the V DAC 146, then the output signal from the charging-voltage error amplifier 236a has one pre-established value. Conversely, if the VFB signal voltage is less than the voltage supplied to the charging-voltage error amplifier 236a by the V DAC 146, then the output signal from the charging-voltage error amplifier 236a has a different pre-established value. The other input terminal of the charging-voltage error amplifier 236b receives an Vmax signal from the maximum-charging-voltage voltage divider 56 via a Vmax signal line 244. If the VFB signal voltage exceeds the Vmax signal voltage, then the output signal from the charging-voltage error amplifier 236b has one pre-established value. Conversely, if the VFB signal voltage is less than the Vmax signal voltage, then the output signal from the charging-voltage error amplifier 236b has a different pre-established value.

The error summing circuit 232 includes a pair of charging-current programming resistors 254a and 254b. One terminal of the charging-current programming resistor 254a connects to an output of the charging-current error amplifier 234a while one terminal of the charging-current programming resistor 254b receives the supply voltage VDD present on the 5 volt supply line 54. The other terminal of the charging-current programming resistor 254b connects to a source terminal of a P-MOS transistor 261. The error summing circuit 232 also includes a pair of charging-voltage programming resistors 256a and 256b. One terminal of the charging-voltage programming resistor 256a connects to an output of the charging-voltage error amplifier 236a while one terminal of the charging-voltage programming resistor 256b receives the supply voltage VDD present on the 5 volt supply line 54. The other terminal of the charging-current programming resistor 254b connects to a source terminal of a P-MOS transistor 262. Gate terminals of the P-MOS transistors 261 and 262 connect to outputs respectively of the charging-current error amplifier 234b and the charging-voltage error amplifier 236b. Drain terminals of the P-MOS transistors 261 and 262 connect via an error-circuit summing-junction 258 to the charging-control signal line 233. Switches 264a and 266a, also included in the error summing circuit 232, connect in series respectively between second terminals of the charging-current programming resistor 254a and of the charging-voltage programming resistor 256a and the error-circuit summing-junction 258. Output terminals of the charging-current error amplifier 234a and of the charging-voltage error amplifier 236a also connect to a regulation-mode flip-flop 268.

While the PWM buck converter circuit 60 charges the smart battery 22, a signal from the regulation-mode flip-flop 268, indicated by a dashed line 269 in FIG. 4, closes either one or the other of the switches 264a and 266a. In this way, while battery charging current and voltage are less than the maximum values established respectively by the maximumcharging-voltage voltage divider 56 and by the maximum-charging-current voltage divider 58, the battery charger IC 50 causes the PWM buck converter circuit 60 to operate either in a current regulation mode, or in a voltage regulation mode. During charging of the smart battery 22, the battery charger IC 50 causes the PWM buck converter circuit 60 to initially operate in a current regulation mode with the switch 264a closed and the switch 266a open. During charging, initially the voltage across the smart battery 22 will be low and will rise gradually as the smart battery 22 becomes charged. When the VFB signal indicates that the voltage present on the battery-charging-current line 88 across the smart battery 22 exceeds that established by the signal which the charging-voltage error amplifier 236a receives from the V DAC 146, the output signal from the charging-voltage error amplifier 236a causes the regulation-mode flip-flop 268 to change state. The changed state of the regulation-mode flip-flop 268 opens the switch 264a and closes the switch 266a thereby switching the PWM buck converter circuit 60 into the voltage regulation operating mode. If subsequently the IFBS and IFBZ signals indicate that the battery charging current exceeds that established by the signal which the charging-current error amplifier 234a receives from the I DAC 144, the changed output signal from the charging-current error amplifier 234a causes the regulation-mode flip-flop 268 to again change state 10n thereby returning the PWM buck converter circuit 60 to its current regulation operating mode. Since the smart battery 22 or a computer program executed by the host computer 26 store the data values into the charging-current register 132d and charging-voltage register 132e which establish the battery charging current and voltage specified by the signals transmitted from the I DAC 144 and V DAC 146 to the error summing circuit 232, either the smart battery 22 or the computer program executed by the smart battery 22 actually controls both of these battery charging parameters.

If at any time the battery charging current or voltage exceeds that established respectively by the maximum-charging-current voltage divider 58 and the maximum-charging-voltage voltage divider 56, then the output signal from either the charging-current error amplifier 234b or the charging-voltage error amplifier 236b, or both, turns on the P-MOS transistor 261 or the P-MOS transistor 262, or both. Turning on the P-MOS transistor 261 causes the PWM buck converter circuit 60 to limit the current supplied to the smart battery 22 to the value established by the maximum-charging-current voltage divider 58. Turning on the P-MOS transistor 262 causes the PWM buck converter circuit 60 to limit the voltage applied across the smart battery 22 to the value established by the maximum-charging-voltage voltage divider 56. A table set forth below specifies values for the resistors 254a, 254b, 256a and 256b.

| Resistor | Resistance |
| --- | --- |
| 254a and 256a | 200 KΩ |
| 254b and 256b | 100 KΩ |

To permit controlling how much electrical current the battery charger IC 50 draws, the battery charger IC 50 includes a bias-current circuit 272. The bias-current circuit 272, in conjunction with the resistance value of the bias-current-programming resistor 98, permits programming how large a bias electrical current the bias-current-programming resistor 98 draws.

While there exist various ways of implementing in an IC the battery charger IC 50 illustrated in the block diagram of FIG. 2, operational realities within a battery powered device 20 pose severe technological challenges if the IC is to be fabricated using a conventional 5.0 V Complementary Metal-Oxide-Silicon ("CMOS") process. For example, during charging of the smart battery 22 the voltage present on the battery-charging-current line 88, that is applied across the smart battery 22, may be as high as 16.8 V, or may, if the smart battery 22 is excessively discharged, be as low as 2.5 V. Because the current-sensing resistor 82 connects in series with the smart battery 22 through the reverse-current-protection switch 86, during charging of the smart battery 22 the voltages at opposite terminals of the current-sensing resistor 82, as measured with respect to circuit ground, always exceed the voltage across the smart battery 22. If the battery charger IC 50 were to employ a conventional "high-side" current sensing circuit using a shunt resistor and a simple voltage-divider network, then the comparatively large common-mode voltage range of the ICHP and ICHM signals would be applied to inputs of the charging-current sense amplifier 218. The preferred embodiment of the battery charger IC 50 of the present invention employs a unique charging-current sense amplifier 218, which in conjunction with the sample-and-hold circuit 214, avoids this problem.

Charging-Current Seane Amplifier 218

Figure 5:
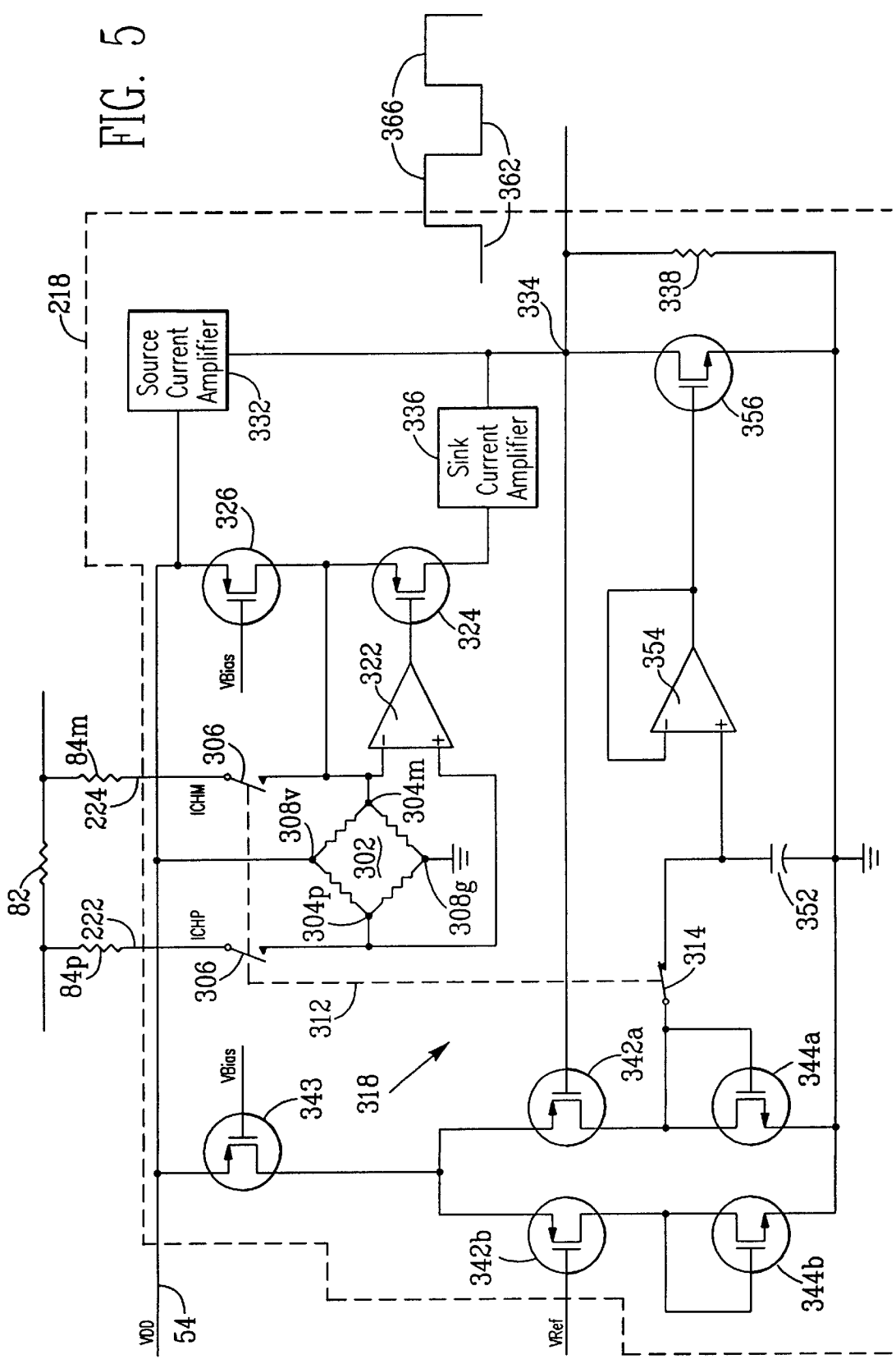
FIG. 5, is a circuit diagram depicting the charging-current sense amplifier depicted in FIG. 2 including an auto-zero portion that operates entirely within the battery charger IC.

To diminish the large common-mode voltage presented by "high-side" current sensing, in the preferred embodiment of the present invention the charging-current sense amplifier 218 of the battery charger IC 50 includes a resistive bridge circuit 302, illustrated in FIG. 5. The ICHP signal line 222 and the ICHM signal line 224 respectively couple the isolation resistors 84p and 84m through a pair of series connected switches 306 that are also included in the charging-current sense amplifier 218 to diagonally opposite terminals 304p and 304m of the bridge circuit 302. Another pair of diagonally opposite terminals 308v and 308g of the bridge circuit 302 are respectively connected to the supply voltage VDD, present on the 5 volt supply line 54, and to circuit ground.

As indicated in FIG. 5 by the dashed line 312, the switches 306 operate synchronously with a switch 314 included in an auto-zero portion 318 of the charging-current sense amplifier 218. As indicated in the illustration of FIG. 5, the switches 306 disconnect the isolation resistors 84p and 84m from the bridge circuit 302 throughout successive auto-zero time-intervals. During such auto-zero time-intervals closure of the switch 314 concurrent with opening of the switches 306 establishes a reference zero charging-current value for the output signal which the charging-current sense amplifier 218 transmits to the sample-and-hold circuit 214. Then, during immediately successive charging-current-sensing time-intervals that occur between each pair of immediately successive auto-zero intervals, while the switch 314 is open the switches 306 close to couple the voltage across the current-sensing resistor 82 through the isolation resistors 84p and 84m to the bridge circuit 302. Thus, during each charging-current sensing interval the output of charging-current sense amplifier 218 transmits to the sample-and-hold circuit 214 a signal which is proportional to the battery charging current then flowing through the current-sensing resistor 82.

To permit sensing the charging current flowing through the current-sensing resistor 82, the diagonally opposite terminals 304p and 304m of the bridge circuit 302 connect respectively to non-inverting and to inverting input terminals of a differential amplifier 322. An output terminal of the differential amplifier 322 connects to a gate of a P-MOS transistor 324. A source terminal of the P-MOS transistor 324 connects to a drain terminal of a P-MOS transistor 326, which supplies a fixed, pre-established electrical current to the P-MOS transistor 324, and to the terminal 304m of the bridge circuit 302. To provide the pre-established current which the P-MOS transistor 326 supplies to the P-MOS transistor 324, a source terminal of the P-MOS transistor 326 receives the supply voltage VDD, present on the 5 volt supply line 54, while a gate terminal of the P-MOS transistor 326 receives a fixed VBias voltage.

Connection of the source of the P-MOS transistor 324 to the terminal 304m forms a closed-loop that includes the differential amplifier 322 and the P-MOS transistor 324. Connected in this closed-loop configuration the differential amplifier 322 and the P-MOS transistor 324 operate as a unity voltage gain amplifier that maintains identical voltages at the diagonally opposite terminals 304p and 304m of the bridge circuit 302. Since the charging-current sense amplifier 218 is fabricated with well matched, equal value resistors for all legs of the bridge circuit 302, exact matching of the voltages at the diagonally opposite terminals 304p and 304m means that identical electrical currents flow through each of the diagonally opposite terminals 304p and 304m.

The fixed electrical current flowing through the P-MOS transistor 326 is coupled to a source-current amplifier 332 which preferably supplies twelve (12) times that amount of current into an output node 334 of the charging-current sense amplifier 218. Analogously, an electrical current flowing out of a drain terminal of the P-MOS transistor 324 is supplied to a sink current amplifier 336 which preferably draws ten (10) times that amount of current from the output node 334. An output resistor 338, across which appears the output signal of the charging-current sense amplifier 218, couples the output node 334 to circuit ground.

The output node 334 of the charging-current sense amplifier 218 is also coupled to a gate terminal of a P-MOS transistor 342a. A source terminal of the P-MOS transistor 342a, coupled in parallel with a source terminal of a matching P-MOS transistor 342b, connects to a drain terminal of a P-MOS transistor 343. The P-MOS transistor 343 supplies a fixed, pre-established electrical current to the P-MOS transistors 342a and 342b. To provide the pre-established current, a source terminal of the P-MOS transistor 343 receives the supply voltage VDD, present on the 5 volt supply line 54, while a gate terminal of the P-MOS transistor 343 receives a fixed VBias voltage. A gate terminal of the P-MOS transistor 342b receives a VRef potential of 1.5 V. Drain terminals of the P-MOS transistors 342a and 342b are respectively coupled to drain terminals of a matched pair of current sink N-MOS transistors 344a and 344b. Gate terminals of the N-MOS transistors 344a and 344b are respectively coupled to the drain terminals thereof, while source terminals of the N-MOS transistors 344a and 344b connect in parallel to circuit ground.

During each successive auto-zero time-interval, while the switch 314 of the auto-zero portion 318 remains closed, the voltage present at the series connected drains of the transistors 342a and 342b is applied both across an auto-zero-voltage storage-capacitor 352 connected to circuit ground, and to a non-inverting input terminal of a differential amplifier 354. An output terminal of the differential amplifier 354 connects to an inverting input terminal of the differential amplifier 354, and to a gate of a N-MOS transistor 356. Consequently, with respect to the voltage present at the auto-zero-voltage storage-capacitor 352 the differential amplifier 354 operates as a high input impedance, unity voltage gain stage. A source of the N-MOS transistor 356 connects to circuit ground while a drain of the N-MOS transistor 356 connects to the output node 334 of the charging-current sense amplifier 218.

During each successive auto-zero time-interval, indicated by successive horizontal line segments 362 in a voltage waveform diagram included in FIG. 5, closure of the switch 314 forms the P-MOS transistor 342a, the differential amplifier 354 and the N-MOS transistor 356 into a closed-loop. Thus during each such auto-zero time-interval while the switches 306 are open thereby simulating a zero charging current flowing through the current-sensing resistor 82, the signal applied to the gate of the N-MOS transistor 356, which is determined by the voltage present across the auto-zero-voltage storage-capacitor 352, causes the N-MOS transistor 356 to draw an auto-zero electrical current from the output node 334. Note first that the auto-zero electrical current which the N-MOS transistor 356 draws from the output node 334 causes voltage present at the output node 334 to match exactly the VRef voltage applied to the gate of the P-MOS transistor 342b. Thus, the horizontal line segments 362 in the voltage waveform diagram represent the voltage value VRef. Note also that throughout the charging-current-sensing time-interval the auto-zero electrical current, which the N-MOS transistor 356 draws from the output node 334, compensates for long-term drift or mismatch occurring elsewhere in the charging-current sense amplifier 218 such as in the source-current amplifier 332 and in the sink current amplifier 336.

Subsequently during each successive charging-current-sensing time-interval, indicated by successive horizontal line segments 366 in the voltage waveform diagram, the switch 314 opens and the switches 306 close thereby coupling the voltage across the current-sensing resistor 82 through the isolation resistors 84p and 84m to the diagonally opposite terminals 304p and 304m of the bridge circuit 302. During this charging-current-sensing time-interval, the voltage across auto-zero-voltage storage-capacitor 352 maintains the auto-zero current drawn by the N-MOS transistor 356 essentially constant. Conversely, during such charging-current-sensing time-intervals the electrical current drawn from the output node 334 by the sink current amplifier 336 changes in proportion with the voltage applied across the diagonally opposite terminals 304p and 304m of the bridge circuit 302, i.e. changes in proportion with the voltage across the current-sensing resistor 82. Since the current supplied by the source-current amplifier 332 to and drawn by the N-MOS transistor 356 from the output node 334 during each successive charging-current-sensing time-interval remain substantially constant, the change in electrical current drawn from the output node 334 by the sink current amplifier 336 can alter only the electrical current flowing through the output resistor 338. This change in current flowing through the output resistor 338 increases the voltage present at the output node 334 proportionally to the current flowing through the current-sensing resistor 82. Thus the difference between the voltage present at the output of the charging-current sense amplifier 218, i.e. at the output node 334, during the auto-zero time-intervals, indicated by the horizontal line segments 362, and that present there during the immediately succeeding charging-current-sensing time-intervals, indicated by the horizontal line segments 366, is proportional to the charging current flowing through the current-sensing resistor 82.

Sample-and-Hold Circuit 214

FIG. 4 depicts the sample-and-hold circuit 214 together with the voltage waveform diagram for the output signal transmitted by the charging-current sense amplifier 218 to the sample-and-hold circuit 214. The sample-and-hold circuit 214 includes a zero-reference sampling-switch 372 and a charging-current sampling-switch 374. The switches 372 and 374 connect in series respectively between the input of the sample-and-hold circuit 214 and one terminal of a zero-reference hold-capacitor 376, and one terminal of a charging-current hold-capacitor. The other terminals of the capacitors 376 and 378 both connect to circuit ground. In addition to connecting to the switches 372 and 374, the capacitors 376 and 378 also respectively connect to non-inverting input terminals of unity voltage gain amplifiers 382 and 384. Output terminals of the amplifiers 382 and 384 respectively supply the IFBZ and IFBS signals to the IFBS and IFBZ signal lines 216s and 216z.

Figure 6:
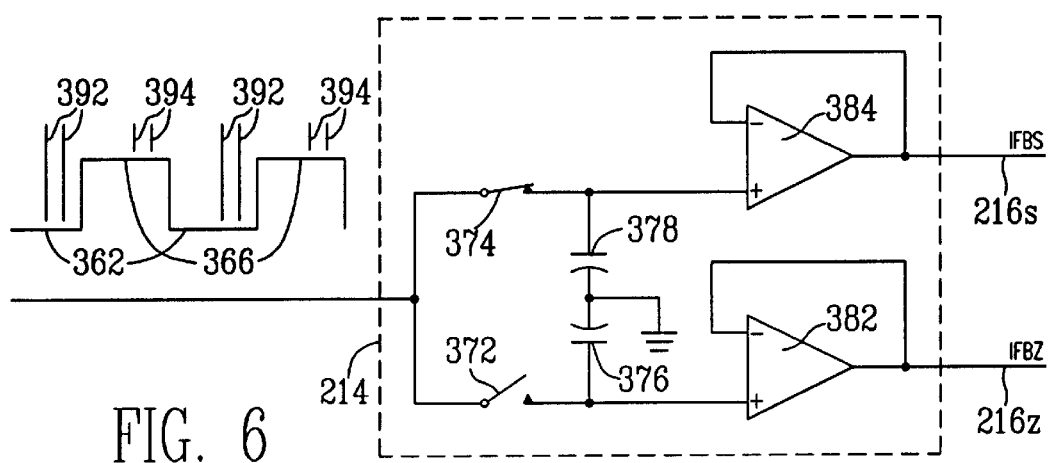
FIG. 6 is a circuit diagram depicting the sample-and-hold circuit depicted in FIG. 2.

Near the end of each auto-zero time-interval during which the charging-current sense amplifier 218 transmits to the sample-and-hold circuit 214 the voltage indicated by the horizontal line segments 362 in the voltage waveform diagrams of FIGS. 5 and 6, as indicated by a pair of parallel vertical lines 392 in FIG. 6 the zero-reference sampling-switch 372 closes momentarily to couple to the zero-reference hold-capacitor 376 and store there a sample of the zero-reference signal then present at the input of the sample-and-hold circuit 214. The amplifier 382 transmits the voltage thus stored on the zero-reference sampling-switch 372 to the IFBZ signal line 216z as the IFBZ signal. Analogously, near the end of each charging-current-sensing time-interval, while the input terminal of the sample-and-hold circuit 214 receives the voltage indicated by the horizontal line segments 366, as indicated by a pair of parallel vertical lines 394 in FIG. 6 the charging-current sampling-switch 374 closes momentarily to couple to the charging-current hold-capacitor and store there a sample of the charging-current signal then present at the input of the sample-and-hold circuit 214. The amplifier 384 transmits the voltage thus stored on the charging-current sampling-switch 374 to the IFBS signal line 216s as the IFBS signal. In this way, in accordance with the present invention the battery charger IC 50, though fabricated with a conventional 5.0 V CMOS process, accommodates the large common-mode voltage range which may occur at the "high-side" current-sensing resistor 82.

Figure 7:
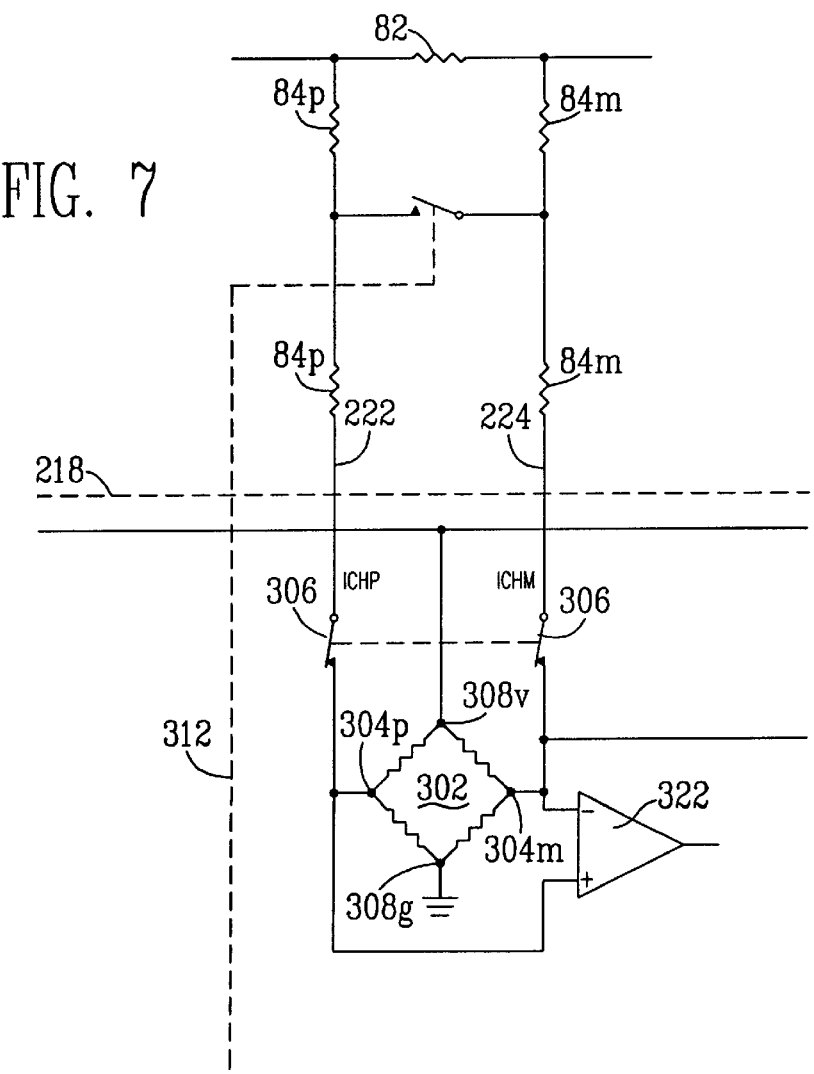
FIG. 7 is a circuit diagram depicting part of the charging-current sense amplifier depicted in FIG. 5 that illustrates an alternative embodiment thereof in which part of the auto-zero portion operates externally to the battery charger IC.

FIG. 7 depicts an alternative embodiment of the device 20 in which the charging-current sense amplifier 218 couples operation of the switch 314 not internally within the battery charger IC 50 to the switches 306, but rather to an external auto-zero switch 402 that is located outside the battery charger IC 50. In the embodiment of the device 20 and battery charger IC 50 illustrated in FIG. 7, the switches 306 always remain closed, and resistors 404p and 404m are respectively interposed between opposite terminals of the current-sensing resistor 82 and terminals of the isolation resistors 84p and 84m. The resistors 404p and 404m, which have a comparatively low resistance such as 1.0 kilohm ("KΩ"), limit the amount of current which may flow through the closed external auto-zero switch 402.

For the embodiment illustrated in FIG. 7, during the auto-zero time-interval, concurrently with closing of the switch 314, the external auto-zero switch 402 also close thereby shorting together terminals of the isolation resistors 84p and 84m that are distal from the bridge circuit 302. Similar to opening of the switches 306 in the embodiment of the charging-current sense amplifier 218 depicted in FIG. 5, closing the external auto-zero switch 402 simulates to the charging-current sense amplifier 218 the PWM buck converter circuit 60 supplying no charging current to the smart battery 22. However, shorting together the terminals of the isolation resistors 84p and 84m rather than opening the switches 306 includes the electrical characteristics of the isolation resistors 84p and 84m in the voltage stored on the auto-zero-voltage storage-capacitor 352 during each auto-zero time-interval. Including the electrical characteristics of the isolation resistors 84p and 84m in the voltage stored on the auto-zero-voltage storage-capacitor 352 relaxes the rather severe matching required for the isolation resistors 84p and 84m from that required for the configuration of the charging-current sense amplifier 218 depicted in FIG. 5.

Although the present invention has been described in terms of the presently preferred embodiment, it is to be understood that such disclosure is purely illustrative and is not to be interpreted as limiting. For example, while the charging-current sense amplifier 218 included in the battery charger IC 50 preferably includes a bridge circuit 302 assembled from resistors, though technologically more complicated in principle the bridge circuit 302 could be assembled using capacitors than resistors. Consequently, without departing from the spirit and scope of the invention, various alterations, modifications, and/or alternative applications of the invention will, no doubt, be suggested to those skilled in the art after having read the preceding disclosure. Accordingly, it is intended that the following claims be interpreted as encompassing all alterations, modifications, or alternative applications as fall within the true spirit and scope of the invention.

What is claimed is:

1. A battery charger integrated circuit ("IC") adapted for controlling operation of a buck converter circuit, the buck converter circuit being adapted for receiving electrical energy from an external power source and supplying electrical energy for charging a battery, the buck converter circuit including a series switch that receives an electrical current from the external power source and that supplies an electrical current to the battery during charging thereof, and the buck converter circuit also including a current-sensing resistor connected in series between the external power source and the battery through which flows electrical current supplied to the battery during charging thereof, the battery charger IC comprising:

a pulse-width-modulation switch drive circuit for supplying to the series switch during charging of the battery an electrical signal adapted for repeatedly turning-on and then turning-off the series switch included in the buck converter circuit; and a charging-current sense amplifier for receiving from the current-sensing resistor and for amplifying an electrical signal which represents the electrical current supplied to the battery during charging thereof, said charging-current sense amplifier including a bridge circuit to which is coupled the electrical signal received from the current-sensing resistor.

2. The battery charger IC of claim 1 wherein the bridge circuit includes at least one resistor.

3. The battery charger IC of claim 1 wherein the bridge circuit is a resistive bridge circuit.

4. The battery charger IC of claim 1 wherein said charging-current sense amplifier further includes an auto-zero portion which automatically compensates for long-term drift or mismatch occurring within said charging-current sense amplifier.

5. The battery charger IC of claim 4 wherein during an auto-zero time-interval the charging-current sense amplifier stores a reference zero charging-current value, and wherein during a successive charging-current sensing-time-interval the charging-current sense amplifier, responsive to the electrical signal received from the current-sensing resistor, generates an electrical signal which represents the electrical current supplied to the battery during charging thereof.

6. The battery charger IC of claim 1 wherein the electrical signal which represents the electrical current supplied to the battery during charging thereof as amplified by the charging-current sense amplifier is used within the battery charger IC for controlling the electrical signal supplied by the switch drive circuit which repeatedly turns on and then off the series switch included in the buck converter circuit.

7. The battery charger IC of claim 1 wherein the switch drive circuit further supplies an electrical signal adapted for repeatedly turning-on a synchronous rectifier switch included in the buck converter circuit while the series switch is turned-off, and then turning-off the synchronous rectifier switch while the a series switch is turned-on.

8. The battery charger IC of claim 7 wherein the electrical signal from the switch drive circuit turns the synchronous rectifier switch on only after the series switch turns-off, and turns the synchronous rectifier switch off only before the series switch turns-on.

9. The battery charger IC of claim 1 wherein the battery is a smart battery, the battery charger IC further comprising a SMB interface and charging control which adapts the battery charger IC for interconnection with the smart battery by a SMBus, and for exchanging data with other devices connected to the SMB interface and charging control including the smart battery.

10. A battery powered device comprising:
a battery for energizing operation of the device;
a buck converter circuit that is adapted for receiving electrical energy from an external power source and supplying electrical energy for charging said battery, said buck converter circuit including a series switch that receives an electrical current from the external power source and that supplies an electrical current to said battery during charging thereof, said buck converter circuit also including a current-sensing resistor connected in series between the external power source said battery through which flows electrical current supplied to said battery during charging thereof; and
a battery charger IC adapted for controlling operation of said buck converter circuit, said battery charger IC including:
a pulse-width-modulation switch drive circuit for supplying to the series switch during charging of said battery an electrical signal adapted for repeatedly turning-on and then turning-off the series switch included in said buck converter circuit; and
a charging-current sense amplifier for receiving from the current-sensing resistor and for amplifying an electrical signal which represents the electrical current supplied to said battery during charging thereof, said charging-current sense amplifier including a bridge circuit to which is coupled the electrical signal received from the current-sensing resistor.

11. The device of claim 10 wherein the bridge circuit includes at least one resistor.

12. The device of claim 10 wherein the bridge circuit is a resistive bridge circuit.

13. The device of claim 12 further comprising at least one resistor disposed between the current-sensing resistor and the bridge circuit through which passes at least a portion of the electrical signal which the bridge circuit receives from the current-sensing resistor.

14. The device of claim 10 wherein said charging-current sense amplifier further includes an auto-zero portion which automatically compensates for long-term drift or mismatch occurring within said charging-current sense amplifier.

15. The device of claim 14 wherein during an auto-zero time-interval the charging-current sense amplifier transmits a signal which causes closure of a switch that is included in the device and which is located outside said battery charger IC, closure of said switch simulating said buck converter circuit supplying no charging electrical current to said battery.

16. The device of claim 14 wherein during an auto-zero time-interval the charging-current sense amplifier stores a reference zero charging-current value, and wherein during a successive charging-current sensing-time-interval the charging-current sense amplifier, responsive to the electrical signal received from the current-sensing resistor, generates an electrical signal which represents the electrical current supplied to said battery during charging thereof.

17. The device of claim 10 wherein the electrical signal which represents the electrical current supplied to said battery during charging thereof as amplified by the charging-current sense amplifier is used within said battery charger IC for controlling the electrical signal supplied by the switch drive circuit which repeatedly turns on and then off the series switch included in said buck converter circuit.

18. The device of claim 10 wherein:
said buck converter circuit further includes a synchronous rectifier switch; and
the switch drive circuit supplies an electrical signal adapted for repeatedly turning-on the synchronous rectifier switch while the series switch is turned-off, and then turning-off the synchronous rectifier switch while the series switch is turned-on.

19. The device of claim 18 wherein the electrical signal from the switch drive circuit turns the synchronous rectifier switch on only after the series switch turns-off, and turns the synchronous rectifier switch off only before the series switch turns-on.

20. The device of claim 10 wherein:
said battery is a smart battery;
the device further comprises a SMBus that interconnects said smart battery with said battery charger IC; and
said battery charger IC further includes a SMB interface and charging control that is coupled to said SMBus, and via which said battery charger IC exchanges data with other devices connected to the SMBus including said smart battery.

21. The battery charger IC of claim 1 wherein said battery charger IC further supplies an electrical signal that is adapted for:
turning a reverse-current-protection switch on when the electrical current charging the battery exceeds a first pre-established threshold to provide a low-resistance path through the reverse-current-protection switch between the buck converter circuit and the battery; and
for turning the reverse-current-protection switch off when the electrical current charging the battery is less than a second pre-established threshold thereby blocking reverse-current flow through the reverse-current-protection switch from the battery to the buck converter circuit.

22. The device of claim 10 further comprising a reverse-current-protection switch connected in series between said buck converter circuit and said battery that is operable both to provide a low-resistance path between said buck converter circuit and said battery, and to block reverse-current flow through said reverse-current-protection switch from said battery to said buck converter circuit; and
said battery charger IC supplies an electrical signal to said reverse-current-protection switch:

for turning said reverse-current-protection switch on when the electrical current charging said battery exceeds a first pre-established threshold; and for turning said reverse-current-protection switch off when the electrical current charging said battery is less than a second pre-established threshold.

23. A battery charger integrated circuit ("IC") adapted for controlling operation of a buck converter circuit, the buck converter circuit being adapted for receiving electrical energy from an external power source and supplying electrical energy for charging a battery, the buck converter circuit including a series switch that receives an electrical current from the external power source and that supplies an electrical current to the battery during charging thereof, and the buck converter circuit also including a current-sensing resistor connected in series between the external power source and the battery through which flows electrical current supplied to the battery during charging thereof, the battery charger IC comprising:

a pulse-width-modulation switch drive circuit for supplying to the series switch during charging of the battery an electrical signal adapted for repeatedly turning-on and then turning-off the series switch included in the buck converter circuit; and a charging-current sense amplifier for receiving from the current-sensing resistor and for amplifying an electrical signal which represents the electrical current supplied to the battery during charging thereof, said charging-current sense amplifier including an auto-zero portion which automatically compensates for long-term drift or mismatch occurring within said charging-current sense amplifier.

24. The battery charger IC of claim 23 wherein said charging-current sense amplifier includes a bridge circuit which receives the electrical signal from the current-sensing resistor, and which includes at least one resistor.

25. The battery charger IC of claim 23 wherein said charging-current sense amplifier includes a resistive bridge circuit which receives the electrical signal received from the current-sensing resistor.

26. The battery charger IC of claim 23 wherein during an auto-zero time-interval the charging-current sense amplifier stores a reference zero charging-current value, and wherein during a successive charging-current sensing-time-interval the charging-current sense amplifier, responsive to the electrical signal received from the current-sensing resistor, generates an electrical signal which represents the electrical current supplied to the battery during charging thereof.

27. The battery charger IC of claim 23 wherein the electrical signal which represents the electrical current supplied to the battery during charging thereof as amplified by the charging-current sense amplifier is used within the battery charger IC for controlling the electrical signal supplied by the switch drive circuit which repeatedly turns on and then off the series switch included in the buck converter circuit.

28. The battery charger IC of claim 23 wherein the switch drive circuit further supplies an electrical signal adapted for repeatedly turning-on a synchronous rectifier switch included in the buck converter circuit while the series switch is turned-off, and then turning-off the synchronous rectifier switch while the series switch is turned-on.

29. The battery charger IC of claim 28 wherein the electrical signal from the switch drive circuit turns the synchronous rectifier switch on only after the series switch turns-off, and turns the synchronous rectifier switch off only before the series switch turns-on.

30. The battery charger IC of claim 23 wherein said battery charger IC further supplies an electrical signal that is adapted for:

turning a reverse-current-protection switch on when the electrical current charging the battery exceeds a first pre-established threshold to provide a low-resistance path through the reverse-current-protection switch between the buck converter circuit and the battery; and for turning the reverse-current-protection switch off when the electrical current charging the battery is less than a second pre-established threshold thereby blocking reverse-current flow through the reverse-current-protection switch from the battery to the buck converter circuit.

31. The battery charger IC of claim 23 wherein the battery is a smart battery, the battery charger IC further comprising a SMB interface and charging control which adapts the battery charger IC for interconnection with the smart battery by a SMBus, and for exchanging data with other devices connected to the SMB interface and charging control including the smart battery.

32. A battery powered device comprising:

a battery for energizing operation of the device;

a buck converter circuit that is adapted for receiving electrical energy from an external power source and supplying electrical energy for charging said battery, said buck converter circuit including a series switch that receives an electrical current from the external power source and that supplies an electrical current to said battery during charging thereof, said buck converter circuit also including a current-sensing resistor connected in series between the external power source said battery through which flows electrical current supplied to said battery during charging thereof;

a battery charger IC adapted for controlling operation of said buck converter circuit, said battery charger IC including:

a pulse-width-modulation switch drive circuit for supplying to the series switch during charging of said battery an electrical signal adapted for repeatedly turning-on and then turning-off the series switch included in said buck converter circuit; and a charging-current sense amplifier for receiving from the current-sensing resistor and for amplifying an electrical signal which represents the electrical current supplied to said battery during charging thereof, said charging-current sense amplifier including an auto-zero portion which automatically compensates for long-term drift or mismatch occurring within said charging-current sense amplifier.

33. The device of claim 32 wherein said charging-current sense amplifier includes a bridge circuit which receives the electrical signal from the current-sensing resistor, and which includes at least one resistor.

34. The device of claim 32 wherein said charging-current sense amplifier includes a resistive bridge circuit which receives the electrical signal received from the current-sensing resistor.

35. The device of claim 34 further comprising at least one resistor disposed between the current-sensing resistor and the bridge circuit through which passes at least a portion of the electrical signal which the bridge circuit receives from the current-sensing resistor.

36. The device of claim 32 wherein during an auto-zero time-interval the charging-current sense amplifier transmits a signal which causes closure of a switch that is included in the device and which is located outside said battery charger IC, closure of said switch simulating said buck converter circuit supplying no charging electrical current to said battery.

37. The device of claim 32 wherein during an auto-zero time-interval the charging-current sense amplifier stores a reference zero charging-current value, and wherein during a successive charging-current sensing-time-interval the charging-current sense amplifier, responsive to the electrical signal received from the current-sensing resistor, generates an electrical signal which represents the electrical current supplied to said battery during charging thereof.

38. The device of claim 32 wherein the electrical signal which represents the electrical current supplied to said battery during charging thereof as amplified by the charging-current sense amplifier is used within said battery charger IC for controlling the electrical signal supplied by the switch drive circuit which repeatedly turns on and then off the series switch included in said buck converter circuit.

39. The device of claim 32 wherein:
    said buck converter circuit further includes a synchronous rectifier switch; and
    the switch drive circuit supplies an electrical signal adapted for repeatedly turning-on the synchronous rectifier switch while the series switch is turned-off, and then turning-off the synchronous rectifier switch while the series switch is turned-on.

40. The device of claim 39 wherein the electrical signal from the switch drive circuit turns the synchronous rectifier switch on only after the series switch turns-off, and turns the synchronous rectifier switch off only before the series switch turns-on.

41. The device of claim 32 further comprising a reverse-current-protection switch connected in series between said buck converter circuit and said battery that is operable both to provide a low-resistance path between said buck converter circuit and said battery, and to block reverse-current flow through said reverse-current-protection switch from said battery to said buck converter circuit; and
    said battery charger IC supplies an electrical signal to said reverse-current-protection switch:
        for turning said reverse-current-protection switch on when the electrical current charging said battery exceeds a first pre-established threshold; and
        for turning said reverse-current-protection switch off when the electrical current charging said battery is less than a second pre-established threshold.

42. The device of claim 32 wherein:
    said battery is a smart battery;
    the device further comprises a SMBus that interconnects said smart battery with said battery charger IC; and
    said battery charger IC further includes a SMB interface and charging control that is coupled to said SMBus, and via which said battery charger IC exchanges data with other devices connected to the SMBus including said smart battery.

* * * * *

UNITED STATES PATENT AND TRADEMARK OFFICE
CERTIFICATE OF CORRECTION

PATENT NO. : 6,184,660 B1  Page 1 of 1
DATED : February 6, 2001
INVENTOR(S) : Alexandru Hartular It is certified that error appears in the above-identified patent and that said Letters Patent is hereby corrected as shown below:

<u>Title page,</u>
Item [75], the name of the inventor, spelled properly, is -- Alexandru Hartular. --
Item [73], the proper, full indentification for the assignee is -- O2 Micro International Ltd., Grand Cayman, Cayman Islands, B.W.I. (KY) --.

Signed and Sealed this

Fourteenth Day of January, 2003

JAMES E. ROGAN
*Director of the United States Patent and Trademark Office*